US010006558B2

(12) United States Patent
Suematsu

(10) Patent No.: US 10,006,558 B2
(45) Date of Patent: Jun. 26, 2018

(54) PILOT-OPERATED SOLENOID VALVE

(71) Applicant: CKD CORPORATION, Komaki-shi, Aichi (JP)

(72) Inventor: Osamu Suematsu, Komaki (JP)

(73) Assignee: CKD CORPORATION, Komaki-shi (JP)

( * ) Notice: Subject to any disclaimer, the term of this patent is extended or adjusted under 35 U.S.C. 154(b) by 143 days.

(21) Appl. No.: 15/136,342

(22) Filed: Apr. 22, 2016

(65) Prior Publication Data

US 2016/0348803 A1 Dec. 1, 2016

(30) Foreign Application Priority Data

May 26, 2015 (JP) .................................. 2015-106311

(51) Int. Cl.
*F16K 31/06* (2006.01)
*F16K 27/02* (2006.01)
*F16K 31/40* (2006.01)
*F16K 31/42* (2006.01)

(52) U.S. Cl.
CPC ...... *F16K 31/0641* (2013.01); *F16K 27/0236* (2013.01); *F16K 31/402* (2013.01); *F16K 31/42* (2013.01)

(58) Field of Classification Search
None
See application file for complete search history.

(56) References Cited

U.S. PATENT DOCUMENTS

| 5,897,137 A * | 4/1999 | Al-Amin | B60R 21/264 |
| | | | 102/530 |
| 5,975,486 A * | 11/1999 | Dettmann | F16K 31/402 |
| | | | 137/329.4 |
| 8,453,992 B2 * | 6/2013 | Palmer | F16K 31/42 |
| | | | 251/129.16 |
| 2016/0040801 A1 * | 2/2016 | Suematsu | F16K 7/12 |
| | | | 251/129.2 |

FOREIGN PATENT DOCUMENTS

| EP | 2846210 A1 | 3/2015 |
| JP | 2011-085214 A | 4/2011 |
| JP | 5546034 B2 | 7/2014 |
| JP | 2016-037983 A | 3/2016 |

OTHER PUBLICATIONS

Jul. 25, 2017 Office Action issued in Korean Patent Application No. 10-2016-0062677.
Feb. 24, 2018 Office Action issued in Chinese Patent Application No. 201610339012.6.

* cited by examiner

*Primary Examiner* — Jessica Cahill
*Assistant Examiner* — Daphne M Barry
(74) *Attorney, Agent, or Firm* — Oliff PLC

(57) ABSTRACT

A pilot-operated solenoid valve includes a pilot valve unit having a fixed core and a movable core, and a passage block formed with a valve seat which a diaphragm valve element comes into contact or separates from. The pilot valve unit includes an NO port, a common port, and an NC port. The passage block is formed with an inlet port, an outlet port, a back chamber, an NO passage, a common passage, an NC passage an external exhaust passage, and an internal exhaust passage. The solenoid valve further includes a first or second metal ball to seal the external exhaust passage or the internal exhaust passage. The passage block includes a flat cover (Continued)

formed with a communication passage for communicating the recess with the common port.

8 Claims, 18 Drawing Sheets

PILOT-OPERATED SOLENOID VALVE

CROSS-REFERENCE TO RELATED APPLICATIONS

This application is based upon and claims the benefit of priority from the prior Japanese Patent Application No. 2015-106311 filed on May 26 2015, the entire contents of which are incorporated herein by reference.

BACKGROUND OF THE INVENTION

Field of the Invention

The present invention relates to a pilot-operated solenoid valve including a pilot valve unit having a fixed core and a movable core, and a passage block formed with a valve seat which a valve element comes into contact with or separates from.

Related Art

Heretofore, pilot-operated electromagnetic, or solenoid, valves for fluid control are used in for example general industrial machinery such as machine tools, welding machines, fusion cutting machines, transport machines, and air-conditioning equipment, medical machinery such as oxygen enrichers, or others. Some of conventional pilot-operated solenoid valves each include a diaphragm valve element as a main valve element and are configured to control the pressure of a back chamber of the diaphragm valve element by a solenoid valve to open and close the diaphragm valve element.

In a pilot-operated solenoid valve proposed in Patent Document 1, for example, when a first communication passage is to be communicated with a third communication passage, a pilot valve unit is operated to supply fluid to a back chamber of a diaphragm valve element, thereby pressurizing the back chamber, to bring the diaphragm valve element into contact with a valve seat. When the first communication passage is to be communicated with a second communication passage, the pilot valve unit is operated to communicate the back chamber of the diaphragm valve element with atmosphere, thereby discharging air from the back chamber to atmosphere in order to reduce the internal pressure of the back chamber. Thus, the diaphragm valve element is separated from the valve seat.

Further, there is a pilot-operated solenoid valve adaptable to both an external exhaust type configuration for discharging fluid from a back chamber of a diaphragm to atmosphere and an internal exhaust type configuration for discharging fluid from the back chamber of the diaphragm to an outlet port.

RELATED ART DOCUMENTS

Patent Documents

Patent Document 1: Japanese Patent No. 5546034

SUMMARY OF INVENTION

Problems to be Solved by the Invention

However, there are cases where a pilot-operated solenoid valve is demanded to be configured to open by vacuuming a back chamber of a diaphragm valve element. In such cases, the pilot-operated solenoid valve has to be formed with a passage for placing the back chamber of the diaphragm valve element in communication with an outlet port. The conventional pilot-operated solenoid valve is usually made up as the external exhaust type configuration that discharges air from a back chamber to atmosphere and could not be configured as the internal exhaust type that discharges air from the back chamber to the outlet port.

In industry, there is a demand for pilot-operated solenoid valves each having a thickness of about 10 mm to 13 mm and enabling parallel arrangement of a plurality of the pilot-operated solenoid valves. In an oxygen enricher, for example, four pilot-operated solenoid valves are usually arranged in parallel during use. To make an oxygen enricher compact, the pilot-operated solenoid valves are requested to be each compact with a thin thickness of about 10 mm to 13 mm. In particular, a mainstream type of the oxygen enricher is heretofore an installation type. However, a portable type oxygen enricher has been increasingly demanded in recent years. Thus, a thin and compact pilot-operated solenoid valve is highly demanded. The pilot-operated solenoid valve of Patent Document 1 and the pilot-operated solenoid valve adaptable to both the external exhaust type and the internal exhaust type could not meet the demand for a thin size. This is because, when the total thickness of a main block and a cover member is set to about 10 mm, the main block and the cover member each have to be designed with a thin thickness, which makes it difficult to form an inner flow passage.

In Japanese unexamined patent application publication No. 2016-37983, the present applicants proposed a pilot-operated solenoid valve that can be made with a thickness of about 10 mm. However, this art is not adaptable to both the external exhaust type and the internal exhaust type.

The present invention has been made to solve the above problems and has a purpose to provide a thin and compact pilot-operated solenoid valve adaptable to both the internal exhaust type and the external exhaust type.

Means of Solving the Problems

To achieve the above purpose, one aspect of the invention provides a pilot-operated solenoid valve provided with a pilot valve unit having a fixed core and a movable core, and a passage block formed with a valve seat which a valve element comes into contact or separates from, wherein the valve element is a diaphragm valve element, the pilot valve unit includes an NO port, a common port, and an NC port, the passage block is formed with an inlet port, an outlet port, a back chamber defined by the diaphragm valve element, an NO passage for communicating the inlet port with the NO port, a common passage for communicating the back chamber with the common port, an NC passage communicated with the NC port, an external exhaust passage for communicating the NC passage with atmosphere, and an internal exhaust passage for communicating the outlet port with the NC passage, the pilot-operated solenoid valve further includes a sealing member to seal one of the external exhaust passage and the internal exhaust passage, the passage block has a rectangular parallelepiped shape having a pair of wide opposite surfaces and four side surfaces surrounding the wide opposite surfaces, the four side surfaces including a first surface attached thereon with the pilot valve unit and a second surface formed with at least one of the inlet port and the outlet port, the diaphragm valve element is placed in parallel with the pair of wide opposite surfaces, the passage block includes a block body and a flat cover having a flat plate shape, the flat cover including a recess forming the back chamber, and the flat cover is formed with a flat-cover communication passage for communicating the recess with the common port.

DESCRIPTION OF EMBODIMENTS (First Embodiment)

Figure 1:
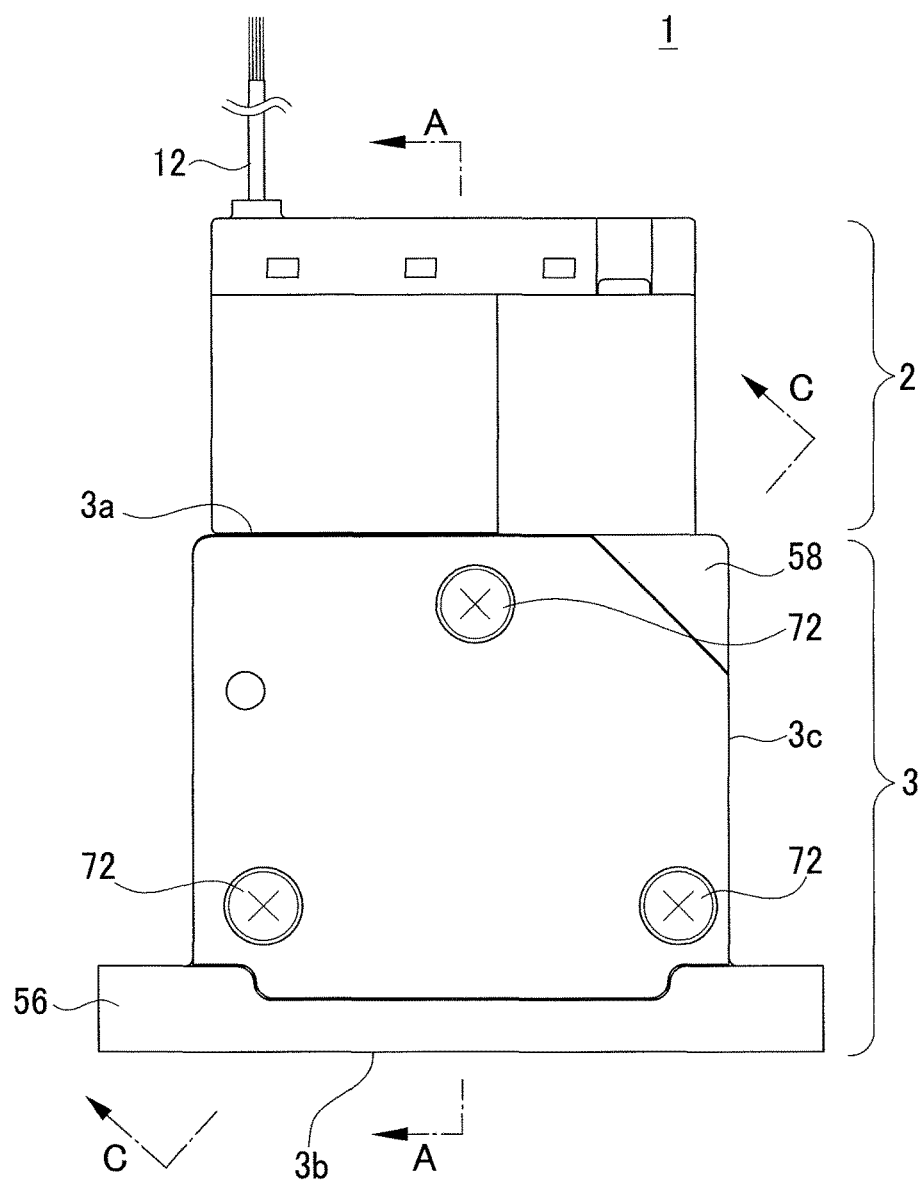
FIG. 1 is a front view of a pilot-operated solenoid valve in a first embodiment according to the invention.
Figure 2:
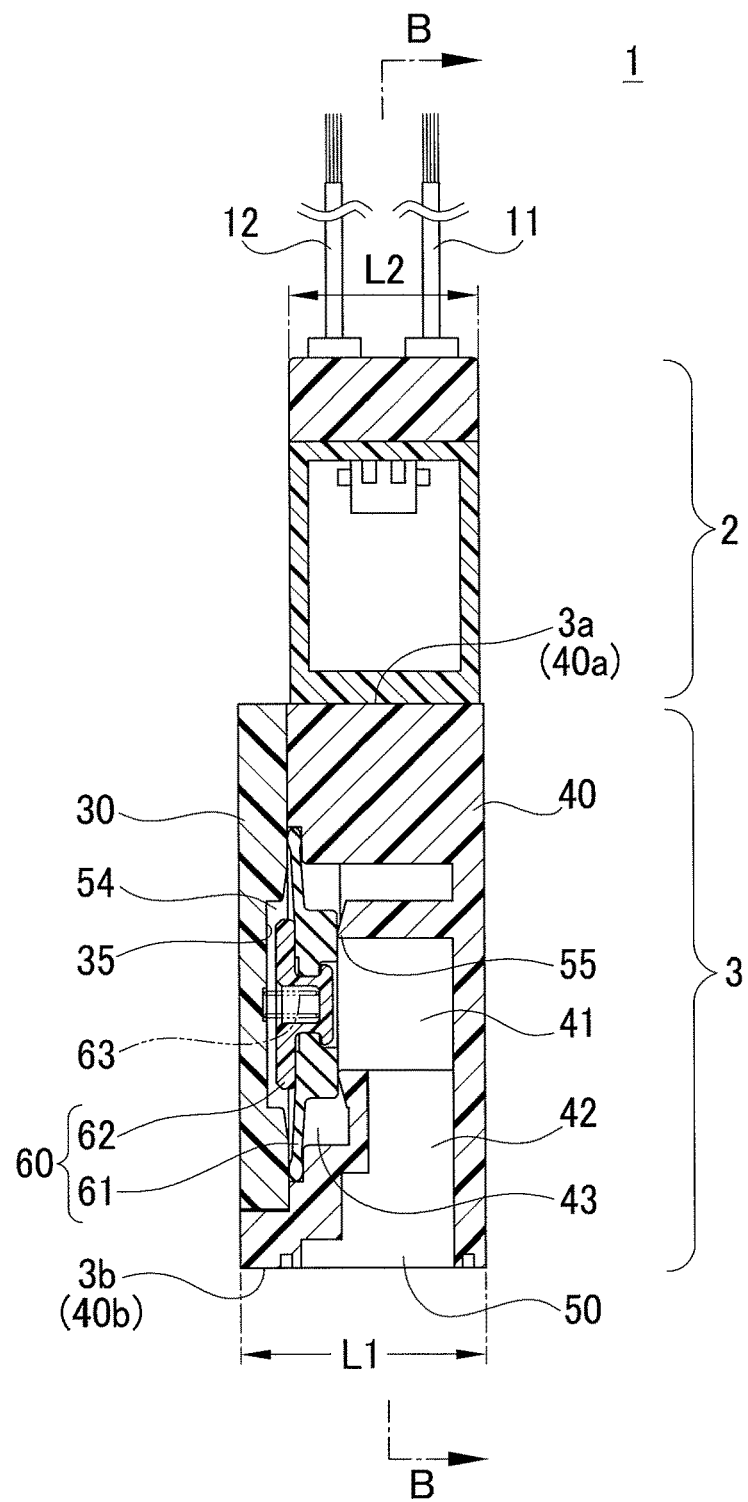
FIG. 2 is a sectional view taken along a line A-A in FIG. 1.
Figure 3:
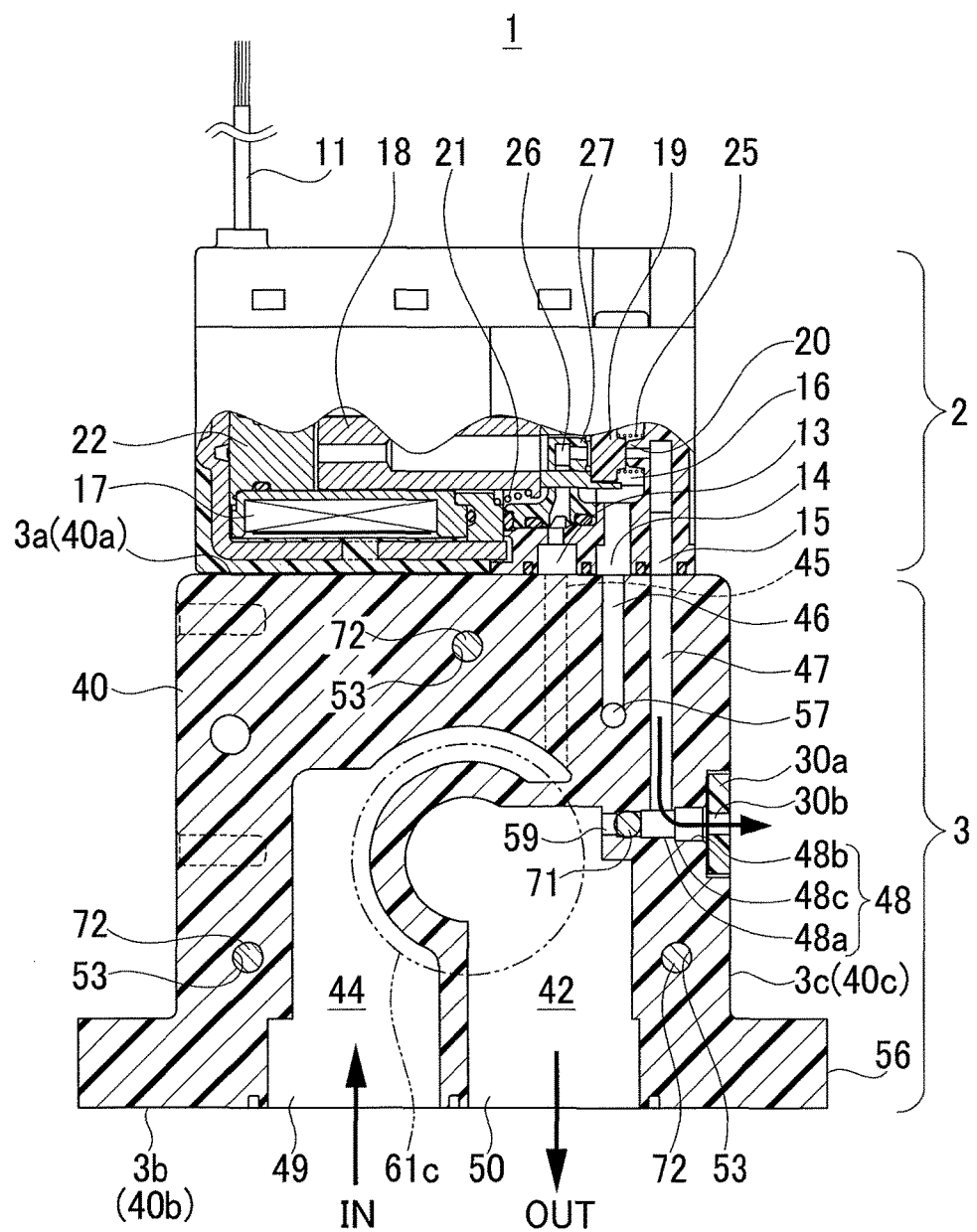
FIG. 3 is a sectional view taken along a line B-B in FIG. 2 and shows an external exhaust type configuration.
Figure 4:
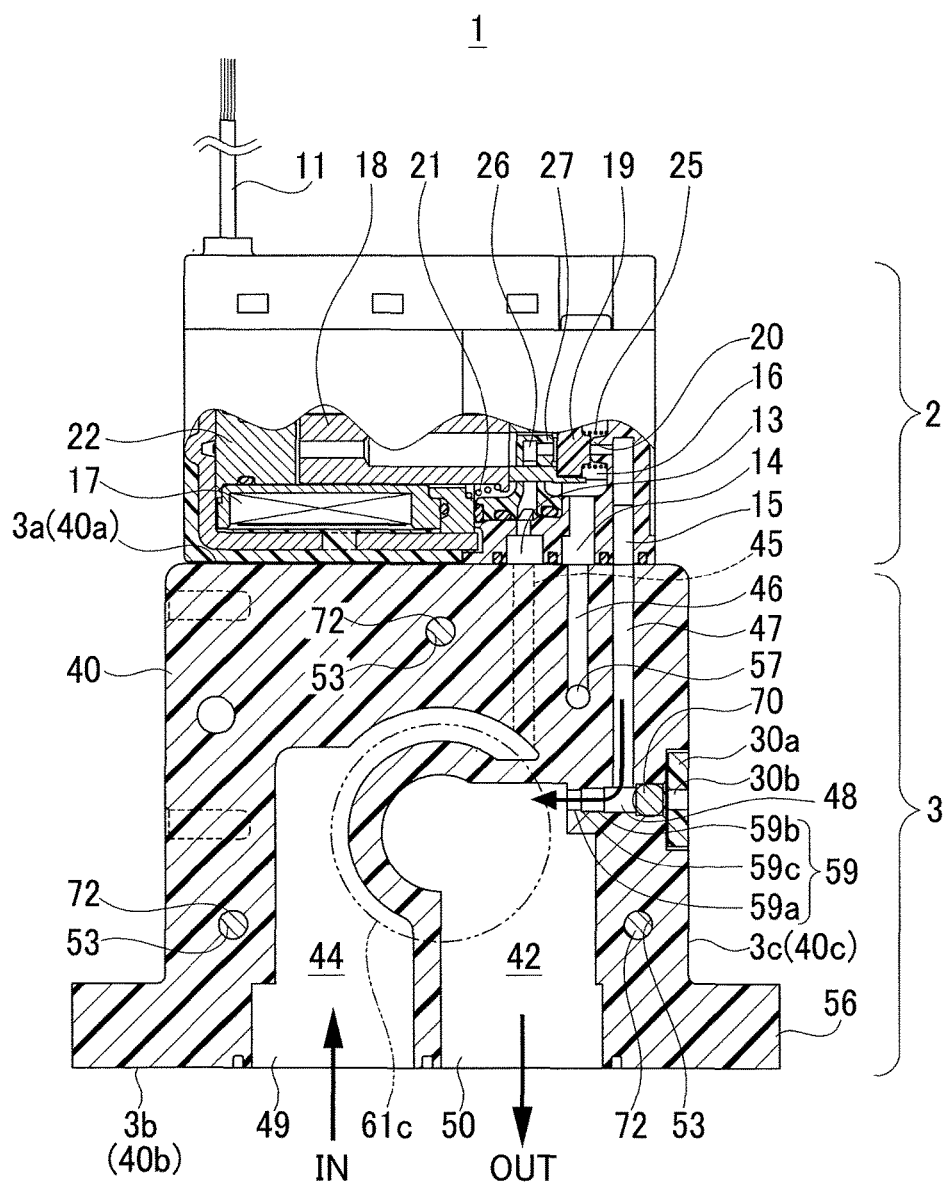
FIG. 4 is a sectional view taken along the line B-B in FIG. 2 and shows an internal exhaust type configuration.
Figure 5:
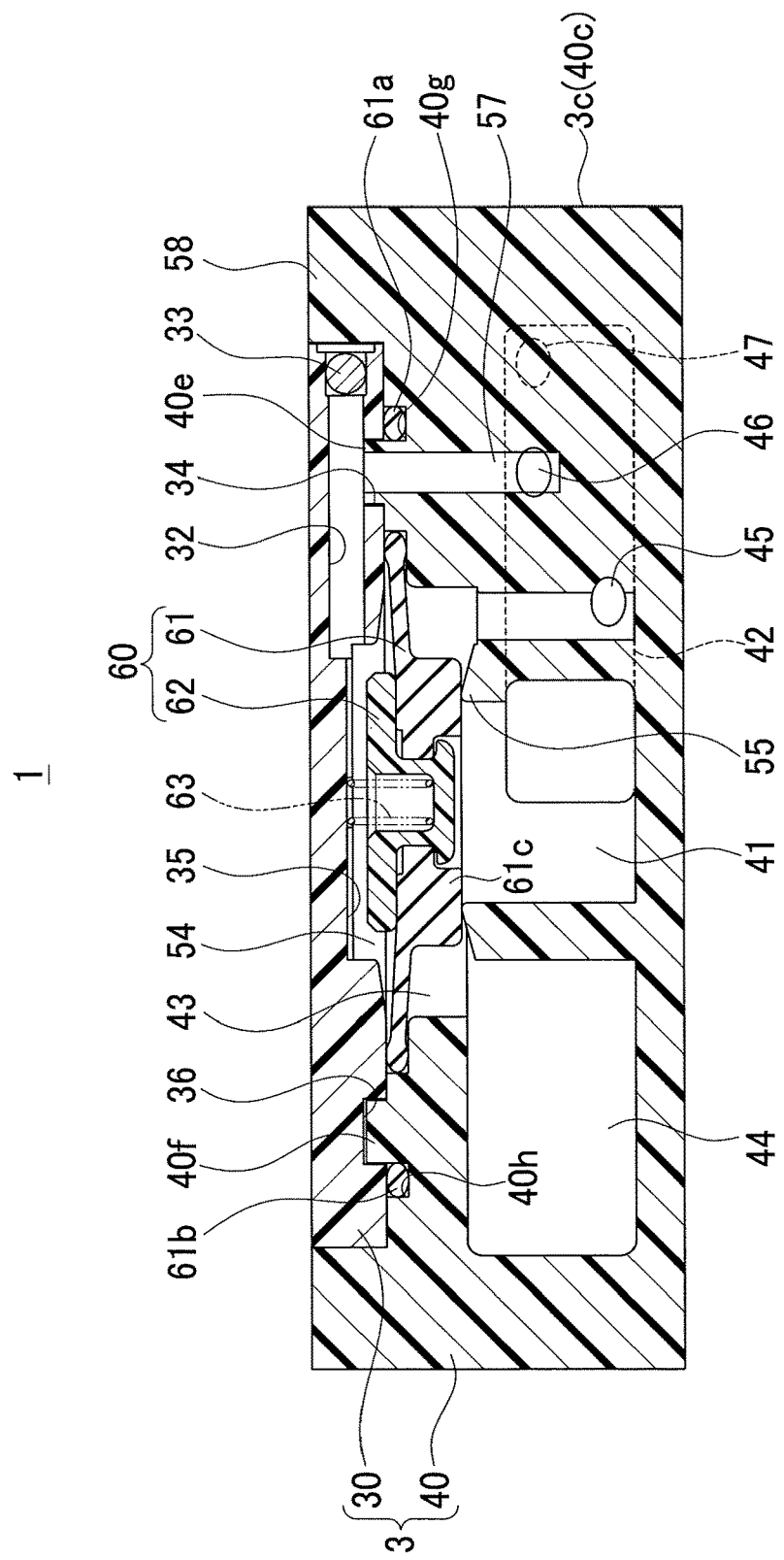
FIG. 5 is a sectional view taken along a line C-C in FIG. 1.
Figure 6:
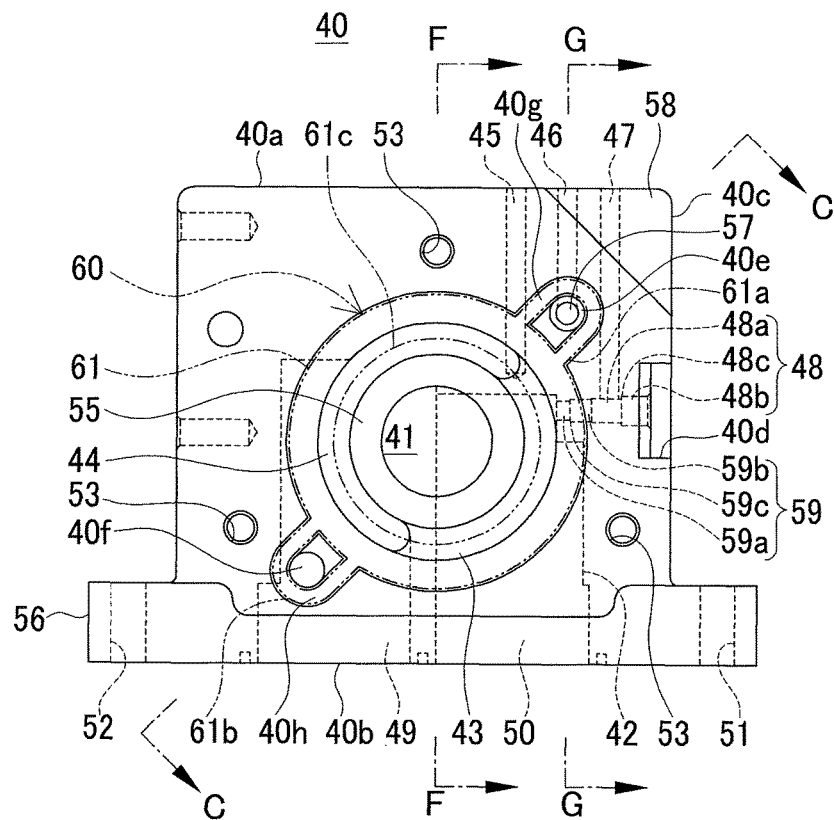
FIG. 6 is a front view of a block body.
Figure 7:
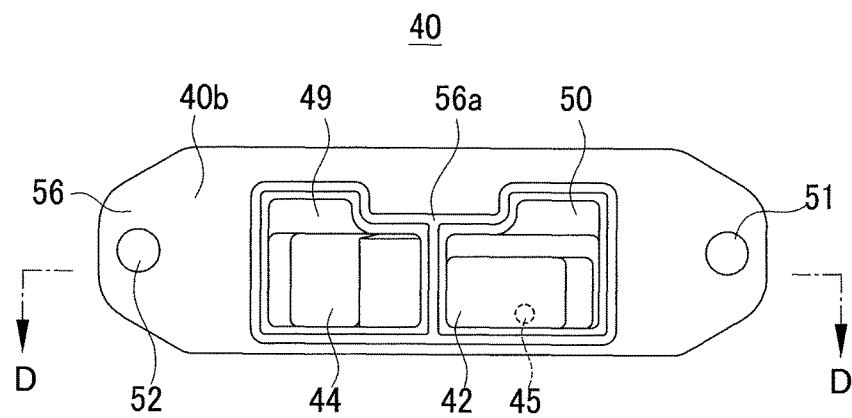
FIG. 7 is a bottom view of the block body shown in FIG. 6.
Figure 8:
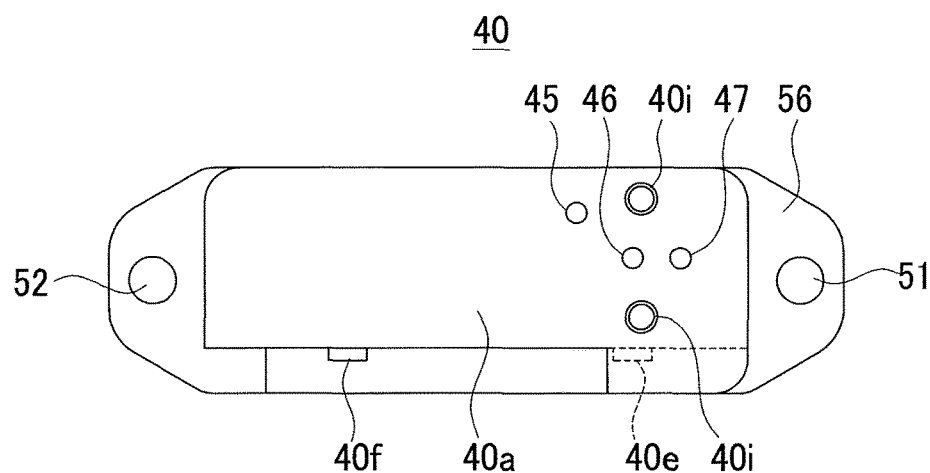
FIG. 8 is a top view of the block body shown in FIG. 6.
Figure 9:
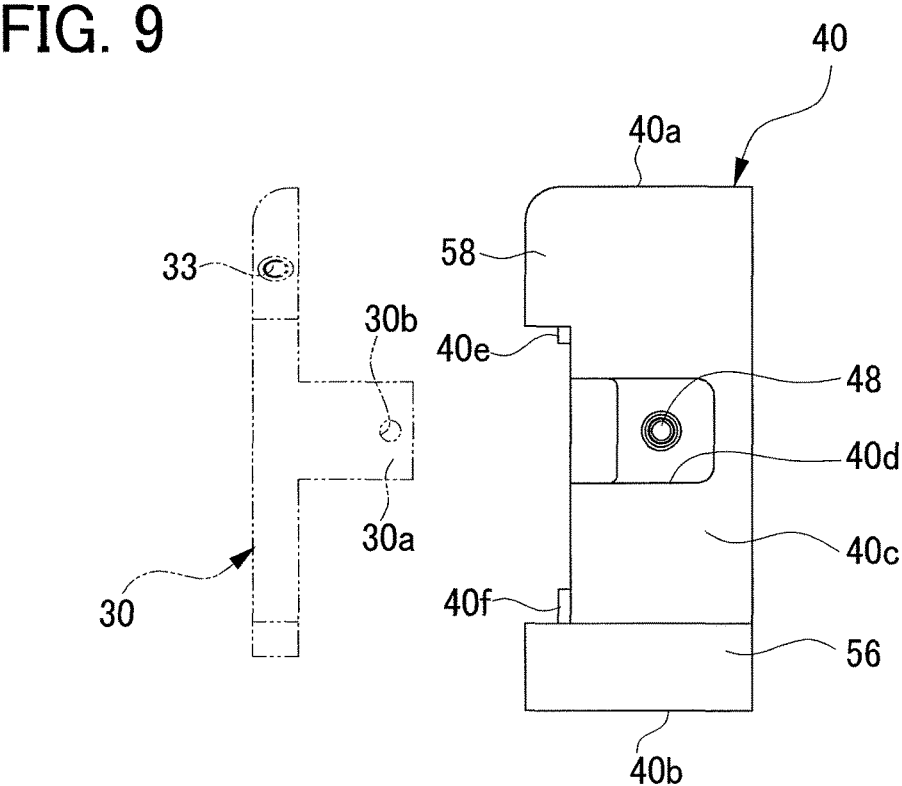
FIG. 9 is a right side view of the block body shown in FIG. 6.
Figure 10:
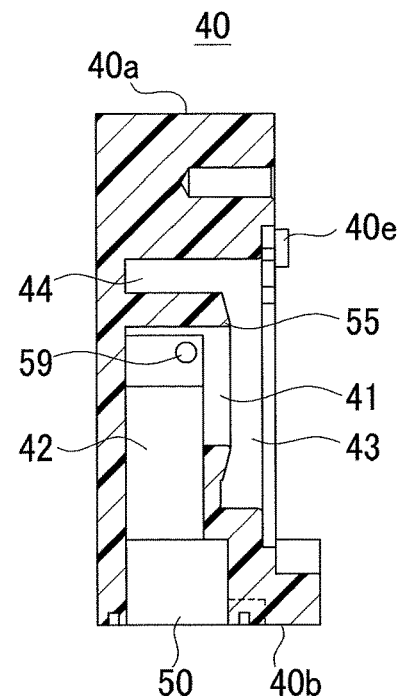
FIG. 10 is a sectional view taken along a line F-F in FIG. 6.
Figure 11:
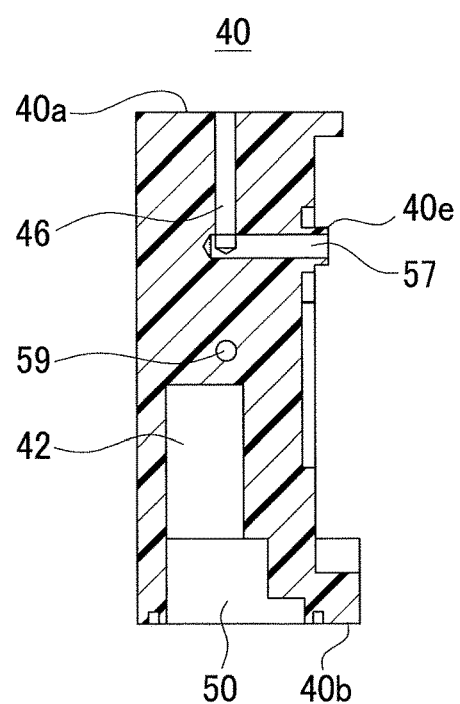
FIG. 11 is a sectional view taken along a ling G-G in FIG. 6.
Figure 12:
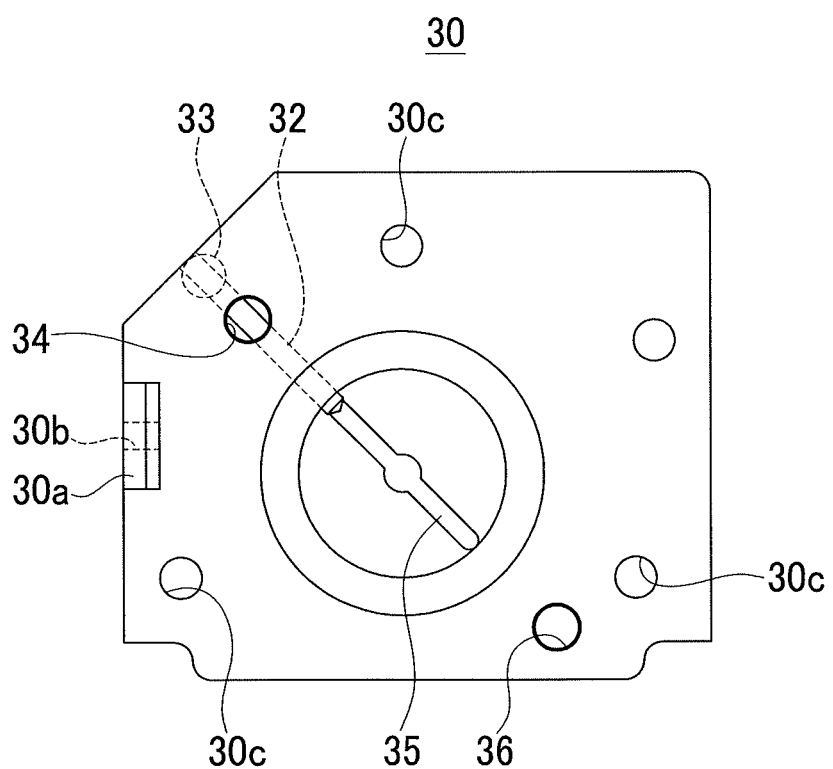
FIG. 12 is a view of a flat cover seen from a recess side.
Figure 13:
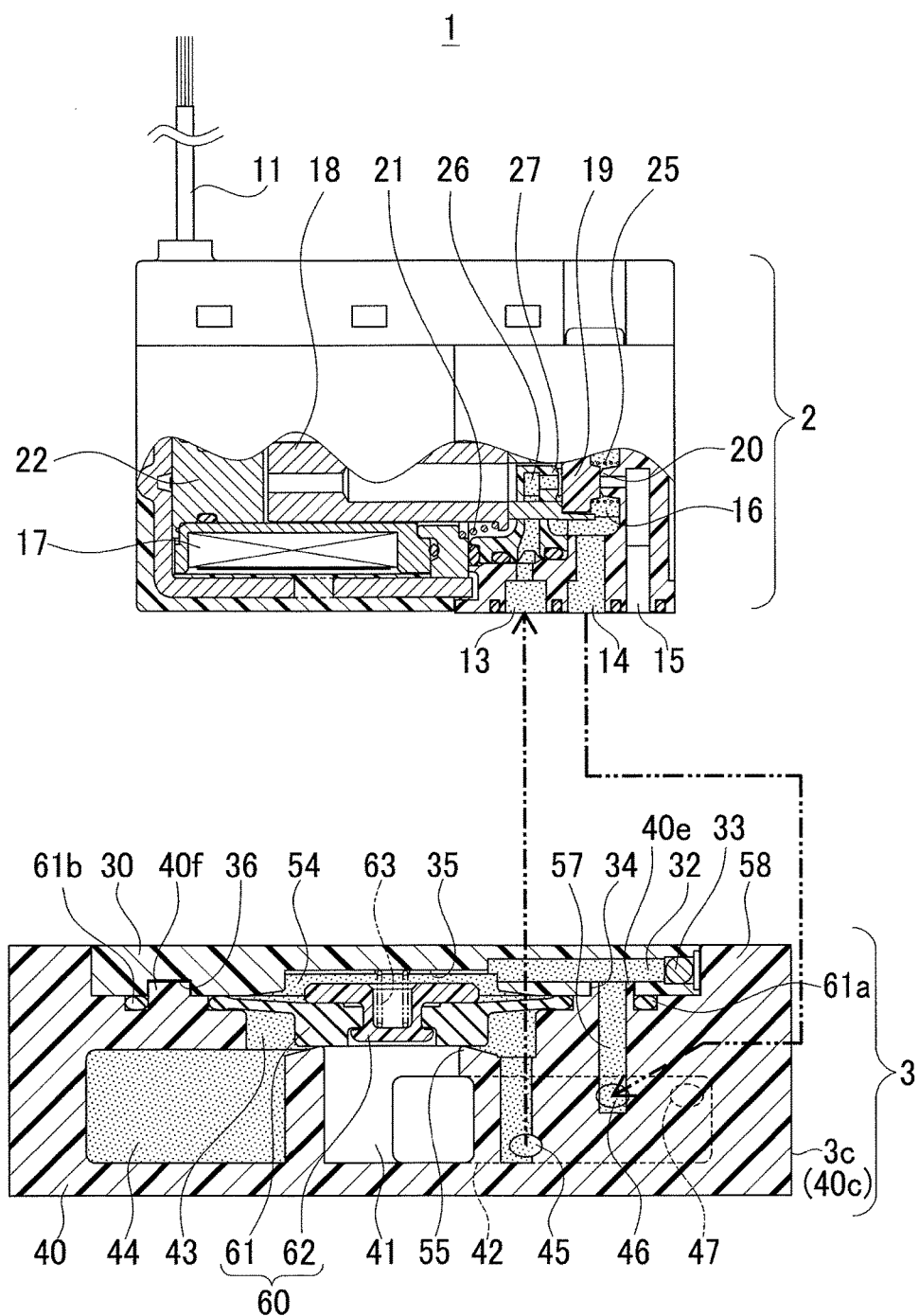
FIG. 13 is a view to explain valve closing operation of a pilot-operated solenoid valve assembled as an internal exhaust type configuration.
Figure 14:
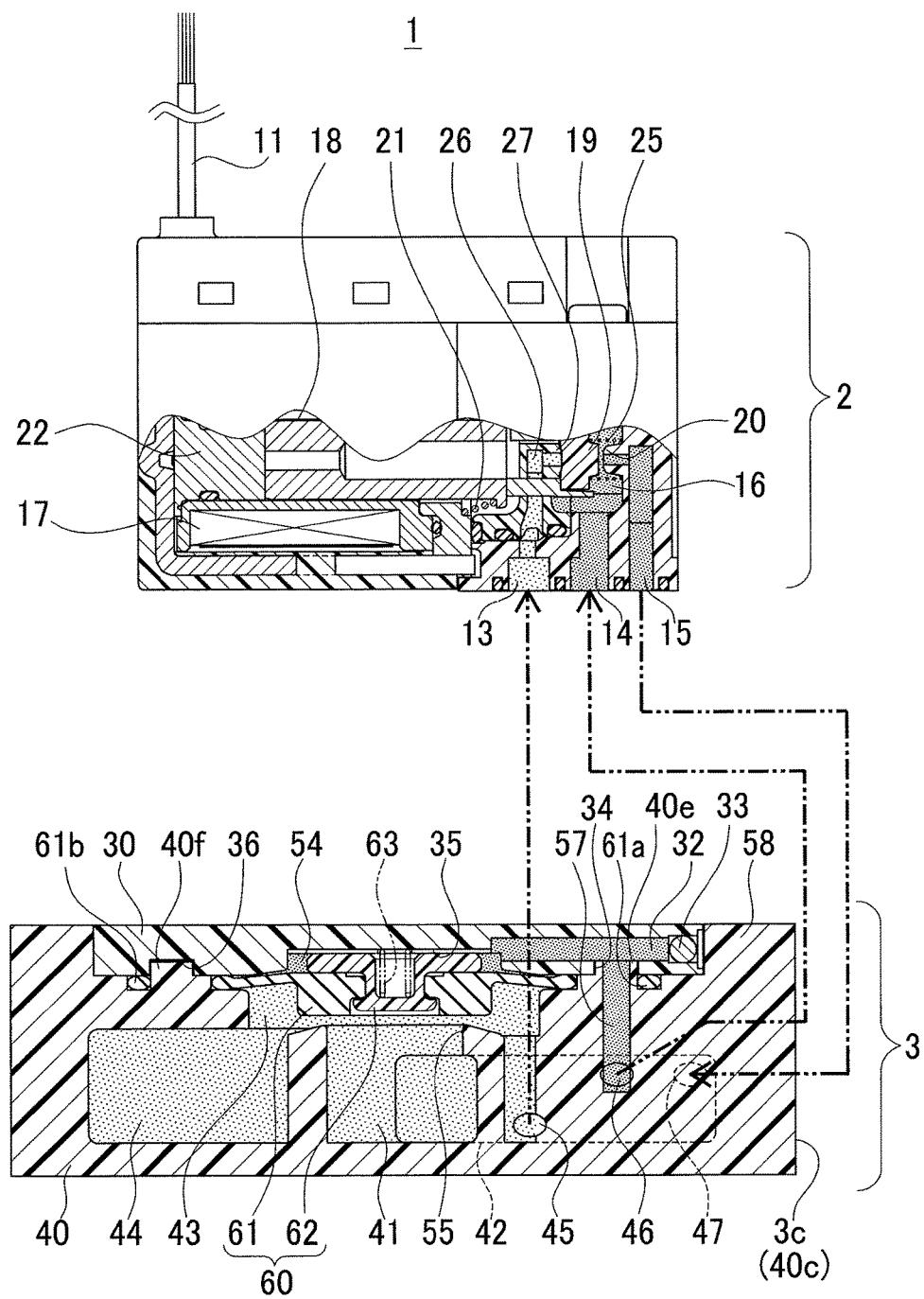
FIG. 14 is a view to explain valve opening operation of the pilot-operated solenoid valve assembled as the internal exhaust type configuration.
Figure 15:
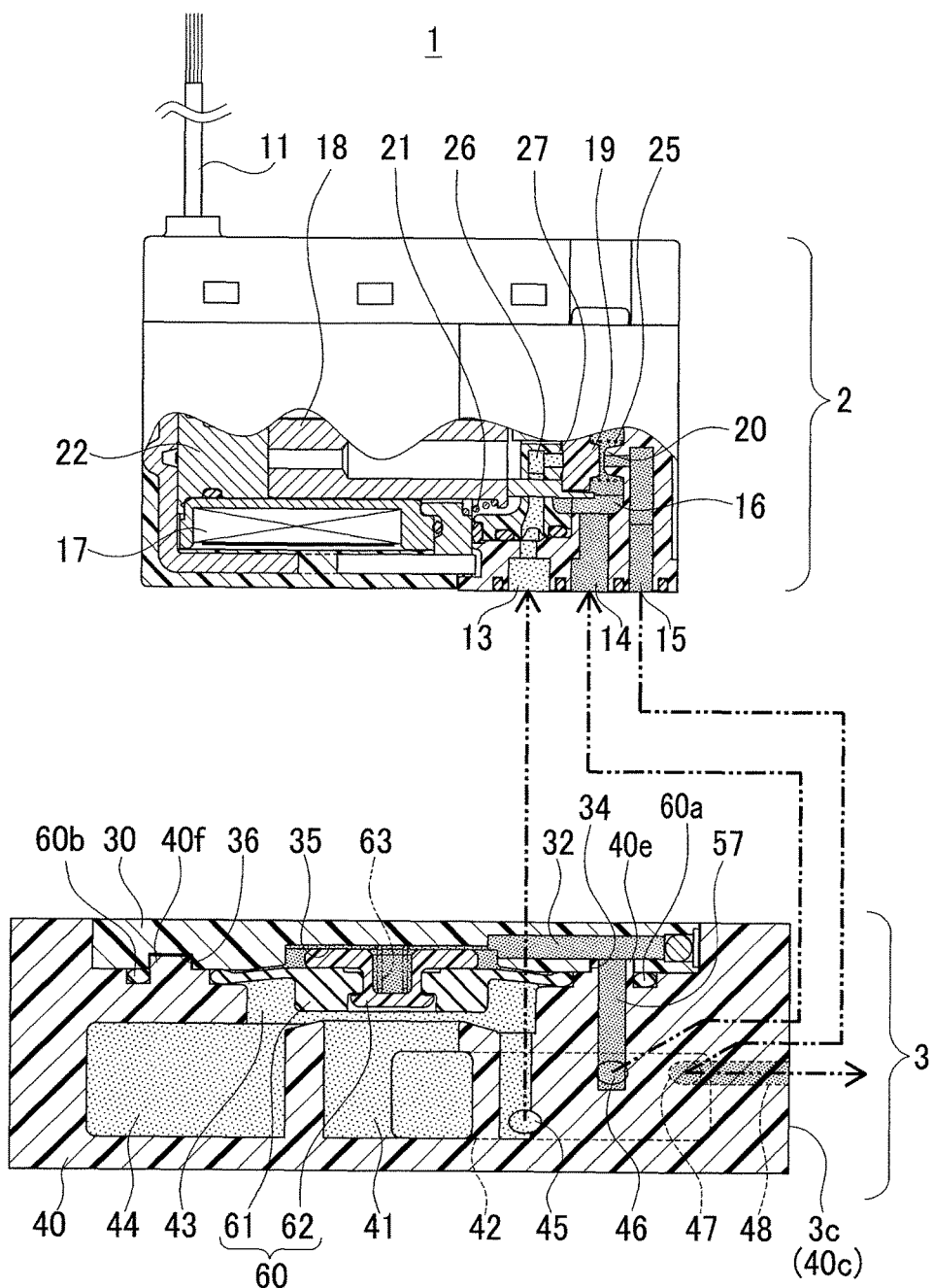
FIG. 15 is a view to explain valve opening operation of the pilot-operated solenoid valve assembled as an external exhaust type configuration.

A detailed description of a first embodiment of a pilot-operated solenoid valve embodying the present invention will now be given referring to the accompanying drawings. Specifically, FIG. 1 is a front view of a pilot-operated solenoid valve (hereinafter, also simply referred to as a "solenoid valve") 1 in the first embodiment. FIG. 2 is a sectional view of the solenoid valve 1 taken along a line A-A in FIG. 2. FIGS. 3 and 4 are sectional views taken along a line B-B in FIG. 2; FIG. 3 illustrates the solenoid valve 1 assembled as an external exhaust type configuration and FIG. 4 illustrates the solenoid valve 1 assembled as an internal exhaust type configuration. FIG. 5 is a sectional view taken along a line C-C in FIG. 1. FIG. 6 is a front view of a block body 40. FIG. 7 is a bottom view of the block body 40 shown in FIG. 6, FIG. 8 is a top view of the same, and FIG. 9 is a right side view of the same. FIG. 10 is a sectional view taken along a line F-F in FIG. 6. FIG. 11 is a sectional view taken along a line G-G in FIG. 6. FIG. 12 is a view of a flat-plate-shaped flat cover 30 seen from a recess 35 side. FIG. 13 is a view to explain valve closing operation of the solenoid valve 1 assembled as the internal exhaust type configuration. FIG. 14 is a view to explain valve opening operation of the solenoid valve 1 assembled as the internal exhaust type configuration. FIG. 15 is a view to explain valve opening operation of the solenoid valve 1 assembled as the external exhaust type configuration. In FIGS. 13 to 15, a pilot valve unit 2 is illustrated in a sectional view corresponding to FIGS. 3 and 4 and a passage block 3 is illustrated in a sectional view corresponding to FIG. 5 to facilitate explanation.

As shown in FIG. 1, the pilot-operated solenoid valve 1 includes the pilot valve unit 2 and the passage block 3.

The passage block 3 is constituted of a block body 40 made of resin and the flat cover 30 made of resin as shown in FIG. 2. A structure of the block body 40 will be first described below. The block body 40 is formed, at its center, with a valve chamber 43 defined by a nearly cylindrical recess. The valve chamber 43 is formed, on its center bottom surface, with a valve seat 55. Further, the valve seat 55 is formed at its center with a valve hole having a bottom surface defining a valve hole chamber 41. A bottom right end of the valve hole chamber 41 shown in FIG. 5 is communicated with an outlet passage 42 having a slit shape. As shown in FIGS. 3 and 4, one end of the outlet passage 42 opens in a side surface 40b of the block body 40 forming a second surface 3b of the passage block 3.

As shown in FIG. 5, a left end of the valve chamber 43 is communicated with an inlet passage 44. This inlet passage 44 is longer than the outlet passage 42 in an up-down direction in the figure (in a direction of the thickness of the block body 40). One end of the inlet passage 44 is open in a C-like shape with respect to the bottom of the valve chamber 43. The other end of the inlet passage 44 is open in a side surface 40b of the block body 40. In the inlet passage 44 shown in FIG. 6, an NO passage 45 is open at one end. As shown in FIGS. 6 and 8, the other end of the NO passage 45 is open in a side surface 40a of the block body 40 forming a first surface 3a (e.g., see FIG. 3) of the passage block 3.

As shown in FIG. 6, the block body 40 is integrally provided with a mounting plate part 56. This mounting plate part 56 is formed with an inlet port 49 communicated with the inlet passage 44 and an outlet port 50 communicated with the outlet passage 42. As shown in FIG. 7, a side surface 40b of the block body 40 is formed with a fixing groove 56a in which a seal member not shown is fitted. The groove 56a extends along the outer circumferences of the inlet port 49 and the outlet port 50. Both end portions of the mounting plate part 56 are formed with holes 51 and 52 for mounting screws. The pilot-operated solenoid valve 1 configured as above will be fixed to a manifold block formed with ports individually corresponding to the inlet port 49 and the outlet port 50 by engagement of the screws and the screw holes 51 and 52.

As shown in FIGS. 3 and 4, the block body 40 is formed with an NC passage 47 having a bottom-closed hole shape extending in an up and down direction and opening in the side surface 40a. The bottom (a lower end in the figure) of the NC passage 47 is communicated with an external exhaust passage 48 and an internal exhaust passage 59. These passages 48 and 59 are formed to coaxially extend in a direction perpendicular to the NC passage 47.

As shown in FIG. 9, the external exhaust passage 48 opens in a side surface 40c of the block body 40 forming a third surface 3c of the passage block 3 (see FIGS. 3 and 4) to place the NC passage 47 in communication with atmosphere. As shown in FIG. 3, the external exhaust passage 48 includes an outside passage portion 48a, an outside press-fit portion 48b, and an outside shoulder portion 48c. The outside passage portion 48a is formed in a straight shape and communicated with the NC passage 47. The outside press-fit portion 48b is located at an open end (a left end in FIG. 3) of the outside passage portion 48a and has a larger diameter than the outside passage portion 48a. The outside shoulder portion 48c is provided between the outside passage portion 48a and the outside press-fit portion 48b. As shown in FIG. 4, the external exhaust passage 48 is configured such that a first metal ball 70 (one example of a sealing member and a first sealing member) is press-fitted in the outside press-fit portion 48b so as to abut on the outside shoulder portion 48c. Accordingly, the first metal ball 70 is placed in close contact with the inner wall of the outside press-fit portion 48b and the outside shoulder portion 48c by distorting resin (plastic) material of those portions. Thus, the external exhaust passage 48 is hermetically sealed, providing communication between the NC passage 47 and the outlet passage 42 through the internal exhaust passage 59.

As shown in FIG. 9, the side surface 40c of the block body 40 is formed with a rectangular recess 40d surrounding the opening of the external exhaust passage 48. The flat cover 30 is fitted on the block body 40 in such a manner that a rectangular protruding piece 30a of the flat cover 30 is engaged with the recess 40d, thereby closing the opening of the external exhaust passage 48. This makes it possible to prevent the first metal ball 70 from falling out of the opening of the external exhaust passage 48 even when fluid pressure acting in a direction toward the opening of the external exhaust passage 48 is applied to the first metal ball 70 closing the external exhaust passage 48. Thus, sealing property can be ensured.

As shown in FIGS. 4 and 10, the internal exhaust passage 59 opens into the outlet passage 42 to place the NC passage 47 in communication with the outlet passage 42. As shown in FIG. 4, the internal exhaust passage 59 includes an inside passage portion 59a, an inside press-fit portion 59b, and an inside shoulder portion 59c. The inside passage portion 59a has a smaller diameter than the outside passage portion 48a and a straight shape extending coaxial with the outside passage portion 48a and communicating with the outlet passage 42. The inside-press-fit portion 59b is located between the outside passage portion 48a and the inside passage portion 59a and has a diameter smaller than the outside passage portion 48a and larger than the inside passage portion 59a. The inside shoulder portion 59c is provided between the inside passage portion 59a and the inside press-fit portion 59b. As shown in FIG. 3, the internal exhaust passage 59 is configured such that a second metal ball 71 (one example of the sealing member and a second sealing member) having a smaller diameter than the first metal ball 70 is inserted in the external exhaust passage 48 and further press-fitted in the inside press-fit portion 59b so as to abut on the inside shoulder portion 59c. Accordingly, the second metal ball 71 is placed in close contact with the inner wall of the inside press-fit portion 59b and the inside shoulder portion 59c by distorting the resin (plastic) material of those portions. Thus, the internal exhaust passage 59 is hermetically sealed, placing the NC passage 47 in communication with atmosphere through the external exhaust passage 48. It is to be noted that the protruding piece 30a is formed therethrough with a breather hole 30b having a smaller diameter than the opening of the external exhaust passage 48, thus enabling smooth air exhaust to atmosphere.

A structure of the flat cover 30 and a mounting structure of the diaphragm valve element 60 will be described below. As shown in FIG. 5, the recess 35 formed in the center of the inner surface of the thin flat cover 30 defines a back chamber 54 of a diaphragm valve element 60.

The diaphragm valve element 60 includes a diaphragm 61 formed in a disc-like shape having a thin peripheral edge portion and a thick central portion, and a resin body 62 integrally formed at the center of the diaphragm 61. The peripheral edge portion of the diaphragm 61 is sealingly sandwiched between the block body 40 and the flat cover 30. The thick central portion of the diaphragm 61 serves as a valve element part that will come into contact with the valve seat 55. The diaphragm valve element 60 is placed to separate the valve chamber 43 and the recess 35 from each other. The diaphragm valve element 60 has a pressure-receiving surface facing to the valve chamber 43 and a back pressure surface facing the back chamber 54 so that these surfaces are nearly equal in area. When compressed air supplied to the inlet port 49 is simply supplied to the back chamber 54, nearly-equal pressure acts on the pressure-receiving surface and the back pressure surface. Thus, a reliable valve closing force could not be obtained. The diaphragm valve element 60 is therefore formed with a recess at the center of an upper surface of the resin body 62, and a coil spring 63 is installed in the recess. This coil spring 63 urges the diaphragm valve element 60 in a direction to come into contact with the valve seat 55. In FIG. 5, the diaphragm valve element 60 is in a contact state with the valve seat 55. Since the urging force of the coil spring 63 is not so strong, as described later, the resultant force of the compressed air supplied to the back chamber 54 and the urging force of the coil spring 63 acts to hold the diaphragm valve element 60 in contact with the valve seat 55.

As shown in FIG. 6, the diaphragm valve element 60 is integrally provided with sealing rings 61a and 61b each extending radially outward from the peripheral edge of the diaphragm 61. These seal rings 61a and 61b are fitted in seal grooves 40g and 40h formed in the block body 40 to set the diaphragm valve element 60 in place during assembling of the block body 40.

Further, as shown in FIG. 5, protruding portions 40e and 40f provided in the block body 40 are fitted in a communication hole 34 and a fit hole 36 formed respectively in correspondence with the positions inside the inner circumferences of the seal grooves 40g and 40h, thereby positioning the flat cover 30 with respect to the block body 40 at the time of assembling.

As shown in FIG. 5, the flat cover 30 is formed with a through hole which forms a flat-cover communication passage 32 in the flat cover 30 so that one end of the through hole opens in a side surface (partially, a bottom surface) of the recess 35, while the other end of the through hole forming the communication passage 32 opens in the side surface of the flat cover 30 as shown in FIG. 12. Specifically, the through hole extends from the side surface of the flat cover 30 to the inner wall of the recess 35 so as to open therein. In the opening of the passage 32 opening in the side surface of the flat cover 30, a metal ball 33 is press-fitted to close the opening. In the present embodiment, the flat cover 30 has a thickness of about 3 mm and the communication passage 32 has a diameter of about 1 mm.

As shown in FIG. 5, the block body 40 is formed, at a right end of an upper surface, with a shielding wall 58 thereby shielding the opening of the communication passage 32 in which the metal ball 33 is inserted. Thus, even when the press-fit state of the metal ball 33 comes loose, the metal ball 33 is prevented from falling out from the opening, and the sealing property is ensured.

As shown in FIG. 5, the communication hole 34 is formed at a position in a lower surface of the communication passage 32 of the flat cover 30. In this communication hole 34, the protruding portion 40e of the block body 40 is inserted and connected. The protruding portion 40e is formed with a communication passage 57. This communication passage 57 is continuous with one end of a common passage 46 formed in the block body 40 as shown in FIG. 11. The other end of the common passage 46 opens in the side surface 40a of the block body 40. As shown in FIG. 5, the communication passage 57 is sealed with the seal ring 61a which is one of the two seal rings 61a and 61b integrally formed with the diaphragm 61.

As shown in FIG. 1, the flat cover 30 is fastened to the block body 40 with three screws 72 screwed in the screw holes 53 of the block body 40 (see FIG. 6). While the flat cover 30 is fastened to the block body 40 with the screws, the thickness L1 of the passage block 3 shown in FIG. 2 is about 13 mm. Herein, the thickness L2 of the pilot valve unit 2 is about 10 mm.

A structure of the pilot valve unit 2 will be described below. In the pilot valve unit 2 shown in FIG. 3, a coil 17 having a hollow part is placed on the left side. At a left end of the hollow part of the coil 17, a fixed core 22 is fixedly placed. At a right end of the hollow part, a movable core 18 is held to be movable linearly. At a right end of the movable core 18, a rubber pilot valve element 19 is provided. This pilot valve element 19 is in contact with a valve seat 20. The valve seat 20 is formed at the top of a truncated conical projection part. The movable core 18 is formed with a flange on which a first urging spring 21 is attached. The first urging spring 21 urges the movable core 18 in a direction to bring the pilot valve element 19 into contact with the valve seat 20. The pilot valve element 19 is urged by a second urging spring 25 in an opposite direction to the valve seat 20. The second urging spring 25 has a smaller urging force than the first urging spring 21. When no current is supplied to the coil 17, as shown in FIG. 3, the pilot valve element 19 is held in contact with the valve seat 20 by a difference between the urging force of the first urging spring 21 and the urging force of the second urging spring 25.

A pilot valve chamber 16 communicates with a common port 14 and an NO port 13. Specifically, the common port 14 and the NO port 13 are communicated with each other through a communication passage 26 and the pilot valve chamber 16. A valve hole at the center of the valve seat 20 is continuous with the NC port 15. When the coil 17 is not energized, as shown in FIG. 13, the pilot valve unit 2 operates to hold the pilot valve element 19 in contact with the valve seat 20, establishing a pilot passage so as to communicate the common port 14 with the NO port 13. In contrast, when the coil 17 is energized, as shown in FIGS. 14 and 15, the pilot valve unit 2 causes the pilot valve element 19 to separate from the valve seat 20 and come into contact with a valve seat 27 provided in an opening portion of the communication passage 26, thereby switching the pilot passage to place the common port 14 in communication with the NC port 15.

The common port 14 of the pilot valve unit 2 communicates with the communication passage 57 through the common passage 46 of the passage block 3 as shown in FIGS. 3 and 4. Similarly, the NO port 13 communicates with the NO passage 45. Similarly, the NC port 15 communicates with the external exhaust passage 48 and the internal exhaust passage 59 through the NC passage 47.

In contrast, as shown in FIG. 2, an upper end face of the pilot valve unit 2 is connected to two wires 11 and 12 connected to the coil 17.

Assembling of the pilot-operated solenoid valve 1 will be described below. As shown in FIG. 3, for assembling the external exhaust type pilot-operated solenoid valve 1, the second metal ball 71 is inserted in the external exhaust passage 48 (the outside press-fit portion 48b and the outside passage portion 48a) of the block body 40 and further placed by press-fit into the internal exhaust passage 59 (the inside press-fit portion 59b). At that time, the second metal ball 71 is required to be press-fitted in the inside press-fit portion 59b until the ball 71 abuts on the inside shoulder portion 59c. This manner allows any worker or operator to set the second metal ball 71 in the same position in the internal exhaust passage 59.

Then, the seal rings 61a and 61b of the diaphragm valve element 60 are respectively fitted in the seal grooves 40g and 40h of the block body 40, thereby placing the diaphragm valve element 60 in position with respect to the block body 40. The flat cover 30 is overlapped with the block body 40 in such a manner that the protruding portions 40e and 40f of the block body 40 are respectively inserted in the communication hole 34 and the fit hole 36 of the flat cover 30 so that the protruding piece 30a is fitted in the recess 40d. The screws 72 are inserted through insertion holes 30c (see FIG. 12) of the flat cover 30 and screwed in screw holes 53 (see FIG. 6) of the block body 40, thereby fixing the flat cover 30 to the block body 40. Accordingly, the peripheral edge of the diaphragm 61 is hermetically sandwiched between the flat cover 30 and the block body 40. The diaphragm valve element 60 thus separates the valve chamber 43 and the recess 35.

The pilot valve unit 2 is placed on the first surface 3a of the passage block 3 made up as above through a seal member not shown interposed between them. Unillustrated screws inserted in the pilot valve unit 2 are tightened into screw holes 40i (see FIG. 8) of the block body 40 to fix the pilot valve unit 2 to the passage block 3. In this manner, the NO port 13, the common port 14, and the NC port 15 of the pilot valve unit 2 are respectively hermetically communicated with the NO passage 45, the common passage 46, and the NC passage 47 of the passage block 3. The thus assembled pilot-operated solenoid valve 1 has an external exhaust type flow passage structure in which the recess 35 communicates with atmosphere via the flat-cover communication passage 32, communication hole 34, communication passage 57, common passage 46, common port 14, NC port 15, NC passage 47, and external exhaust passage 48 to discharge air from the back chamber 54 to atmosphere.

In contrast, for assembling the pilot-operated solenoid valve 1 of internal exhaust type as shown in FIG. 4, the first metal ball 70 is placed by press-fit in the external exhaust passage 48 (the outside press-fit portion 48b) of the block body 40. At that time, the first metal ball 70 is press-fitted in the outside press-fit portion 48b until the ball 70 abuts on the outside shoulder portion 48c. This manner allows any worker or operator to place the first metal ball 70 in the same position in the external exhaust passage 48. The subsequent assembling steps are the same as those of the external exhaust type and therefore are omitted. The thus assembled pilot-operated solenoid valve 1 has a flow passage structure of an internal exhaust type in which the recess 35 communicates with the flat-cover communication passage 32, through hole 34, communication passage 57, common passage 46, common port 14, NC port 15, NC passage 47, internal exhaust passage 59, and outlet passage 42 to discharge air from the back chamber 54 to the outlet port 50.

In the present embodiment, after assembling of the passage block 3, the pilot valve unit 2 is attached to the passage block 3. Alternatively, the passage block 3 may be assembled after the pilot valve unit 2 is attached to the block body 40.

Operations of the pilot-operated solenoid valve 1 will be described below. A first explanation is given to a valve closing operation of the solenoid valve 1 assembled as the internal exhaust type as shown in FIG. 4. While the coil 17 is not energized, as shown in FIG. 13, the first urging spring 21 makes the pilot valve element 19 abut on the valve seat 20 against the urging force of the second urging spring 25. Thus, the common port 14 and the NC port 15 are disconnected from each other. In contrast, since the inlet passage 44 is constantly supplied with for example compressed air, the compressed air is supplied to the common port 14 via the NO passage 45 and the NO port 13. Further, the compressed air is supplied to the back chamber 54 through the common passage 46, communication passage 57, and flat-cover communication passage 32 (see a dot-hatched area in FIG. 13).

While receiving no pressure of the compressed air, the diaphragm valve element 60 is in contact with the valve seat 55 by the coil spring 63, but the force of the coil spring 63 is not so strong as to provide sufficient closing force to tightly hold the diaphragm valve element 60 in a closed position.

When the compressed air is supplied to the back chamber 54, the pressure in the valve hole chamber 41 is low (secondary-side pressure is lower than primary-side pressure), and thus the diaphragm valve element 60 is applied with the closing force obtained as the product of the pressure difference between the back chamber 54 and the valve hole chamber 41 and the opening area (space) of the valve seat. Specifically, since the pressure-receiving surface and the back pressure surface of the diaphragm valve element 60 are nearly equal in area, when the compressed air is supplied to the back chamber 54 in which the diaphragm valve element 60 is not in contact with the valve seat 55, the pressure acting on the pressure-receiving surface and the pressure acting on the back pressure surface are nearly equal. In this case, the diaphragm valve element 60 is brought in contact with the valve seat 55 by the spring force of the coil spring 63. Thus, the compressed air allowed to pass through the valve seat 55 is reduced, causing the secondary-side pressure to decrease. Then, the pressure acting on the back pressure surface becomes larger than the pressure acting on the pressure-receiving surface, so that this pressure difference generates the closing force. In this state, the pilot-operated solenoid valve 1 is in a valve-closed state.

A second explanation is given to a valve opening operation of the solenoid valve 1 assembled as the internal exhaust type as shown in FIG. 4 will be described below. While the coil 17 is energized, as shown in FIG. 14, the movable core 18 is attracted to the magnetized fixed core 22 and thus held in contact with the fixed core 22 against the spring force of the first urging spring 21. Accordingly, the pilot valve element 19 is urged by the second urging spring 25 and separated from the valve seat 20. Thus, the common port 14 and the NC port 15 are communicated with each other. Since the inlet passage 44 is constantly supplied with for example compressed air, the compressed air is supplied to the communication passage 26 through the NO passage 45 and the NO port 13. However, when the common port 14 and the NC port 15 become communicated, the pilot valve element 19 comes into contact with the valve seat 27, blocking communication between the NO port 13 and the common port 14 to stop supply of compression air to the back chamber 54 (see a dot-hatching area with low dot density in FIG. 14). Thus, the NC port 15 is communicated with the outlet passage 42 through the NC passage 47 and the internal exhaust passage 59. Accordingly, the compressed air is discharged from the back chamber 54 to the outlet passage 42 through the flat-cover communication passage 32, communication hole 34, communication passage 57, common passage 46, common port 14, NC port 15, NC passage 47, and internal exhaust passage 59 (see a dot-hatching area with high dot density in FIG. 14). Accordingly, the internal pressure of the back chamber 54 instantly drops.

When the compressed air is released from the back chamber 54, the diaphragm valve element 60 separates from the valve seat 55 by the internal pressure of the valve chamber 43. This allows fluid communication between the valve chamber 43 and the valve hole chamber 41. In this state, the solenoid valve 1 is in a valve open state.

Next, operations of the pilot-operated solenoid valve 1 assembled as the external exhaust type as shown in FIG. 3 will be described below. The external exhaust type pilot-operated solenoid valve 1 is operated for valve closing in a similar manner to the internal exhaust type one. The following explanation is therefore made on only the valve opening operation.

In the external exhaust type pilot-operated solenoid valve 1, as shown in FIG. 15, when the coil 17 is energized, the common port 14 and the NC port 15 are communicated with each other in a similar manner to the internal exhaust type pilot-operated solenoid valve 1 shown in FIG. 14. In this state, even though the inlet passage 44 is constantly supplied with for example compressed air, the compressed air is not supplied to the back chamber 54 as in the internal exhaust type (see a dot-hatching area with low dot density in FIG. 15). Then, the NC port 15 is communicated with atmosphere through the NC passage 47, external exhaust passage 48, breather hole 30*b* of the flat cover 30 (see FIG. 3). Accordingly, the compressed air is discharged from the back chamber 54 to atmosphere through the flat-cover communication passage 32, communication hole 34, communication passage 57, common passage 46, common port 14, NC port 15, NC passage 47, external exhaust passage 48, and breather hole 30*b* (see FIG. 3) (see a dot-hatching area with high dot density in FIG. 15). Accordingly, the internal pressure of the back chamber 54 instantly drops. The valve opening operation of the diaphragm valve element 60 by pressure decrease in the back chamber 54 is similar to that of the internal exhaust type and thus is not described herein.

The second metal ball 71 is subjected to the pressure toward the outlet passage 42 by the compressed air to be discharged to atmosphere. In this case, the second metal ball 71 engages with the inside shoulder portion 59*c* and thus does not fall into the outlet passage 42. Further, the second metal ball 71 is placed in pressure-contact with the inside shoulder portion 59*c* to reliably seal off the internal exhaust passage 59.

As described above, the pilot-operated solenoid valve 1 in the present embodiment includes the pilot valve unit 2 having the fixed core 22 and the movable core 18, and the passage block 3 formed with the valve seat 55 which the valve element comes into contact with or separates from. In this pilot-operated solenoid valve 1, the valve element is the diaphragm valve element 60, the pilot valve unit 2 includes the NO port 13, the common port 14, and NC port 15, the passage block 3 is formed with the inlet port 49, the outlet port 50, the back chamber 54 defined by the diaphragm valve element 60, the NO passage 45 for providing communication between the inlet port 49 and the NO port 13, the common passage 46 for providing communication between the back chamber 54 and the common port 14, the NC passage 47 communicated with the NC port 15, the external exhaust passage 48 for allowing communication between the NC passage 47 and atmosphere, and the internal exhaust passage 59 for allowing communication between the outlet port 50 and the NC passage 47, the pilot-operated solenoid valve 1 further includes the sealing member (the first metal ball 70 or the second metal ball 71) to seal the external exhaust passage 48 or the internal exhaust passage 59, the passage block 3 has a rectangular parallelepiped shape having a pair of wide opposite surfaces, and four side surfaces surrounding the wide opposite surface and including the first surface 3a attached thereon with the pilot valve unit 2, and the second surface 3b formed with the inlet port 49 and the outlet port 50, the diaphragm valve element 60 is placed in parallel to the pair of wide opposite surfaces, the passage block 3 includes the block body 40 and the flat-plate-shaped flat cover 30, the flat cover 30 including the recess 35 forming the back chamber 54, the flat cover 30 is formed with the flat-cover communication passage 32 for providing communication between the recess 35 and the common port 14. Accordingly, the external exhaust passage 48 or the internal exhaust passage 59 has only to be sealed with a corresponding one of the first metal ball 70 and the second metal ball 71 to adapt the flow passage structure of the passage block 3 for either the internal exhaust type or the external exhaust type. Further, since the passage block 3 can be used in common by the external exhaust type and the internal exhaust type, any additional molding dies individually adapted for the external exhaust type and the internal exhaust type are not required. This leads to reduction in manufacturing cost of the pilot-operated solenoid valve. The thin flat cover 30 can be formed with the communication passage 32 by use of the recess 35 to connect the back chamber 54 of the diaphragm valve element 60 with the common port 14 of the pilot valve unit 2. In the present embodiment, therefore, the block body 40 and the flat cover 30 assembled together can have a total thickness as thin as about 13 mm.

In the pilot-operated solenoid valve 1 in the present embodiment, the external exhaust passage 48 and the internal exhaust passage 59 are coaxially aligned with each other, so that the external exhaust passage 48 and the internal exhaust passage 59 used to switch between the internal exhaust type and the external exhaust type can be formed readily in small space. Since the first metal ball 70 or the second metal ball 71 can be easily placed in the external exhaust passage 48 or the internal exhaust passage 59, assembling workability can be improved.

In the pilot-operated solenoid valve 1 in the present embodiment, the external exhaust passage 48 has a larger passage diameter than the internal exhaust passage 59, and the sealing member selectively includes the first metal ball 70 press-fitted in the external exhaust passage 48 or the second metal ball 71 having an insertable size in the external exhaust passage 48 and press-fitted in the internal exhaust passage 59. Accordingly, the second metal ball 71 is easily placed by press-fit in the internal exhaust passage 59 located more inside than the external exhaust passage 48. A flow passage of the external exhaust type can be readily provided in the passage block 3. The first metal ball 70 larger than the second metal ball 71 has only to be inserted through the opening of the external exhaust passage 48 and press-fitted in that passage 48 in order to provide a flow passage of the internal exhaust type in the passage block 3. According to the pilot-operated solenoid valve 1 in the present embodiment, therefore, the flow passage for the internal exhaust type or the external exhaust type can be easily selectively provided with improved assembling workability.

In the pilot-operated solenoid valve 1 in the present embodiment, the first and second metal balls 70 and 71 are each spherical, so that they can be easily selectively placed by press-fit in corresponding one of the external exhaust passage 48 and the internal exhaust passage 59.

In the pilot-operated solenoid valve 1 in the present embodiment, the first and second metal balls 70 and 71 are made of metal, but may be made of resin (plastic). In this case, the plastic ball has only to be welded or bonded while it is press-fit in the passage block 3. This can prevent leakage of compressed air discharged from the back chamber 54 from a gap between the plastic ball and the passage block 3, thereby preventing a decrease in discharging efficiency.

According to the present embodiment, consequently, the pilot-operated solenoid valve 1 can be provided with a thin and compact configuration adaptable for both the internal exhaust type and the external exhaust type.

(Second Embodiment)

Figure 16:
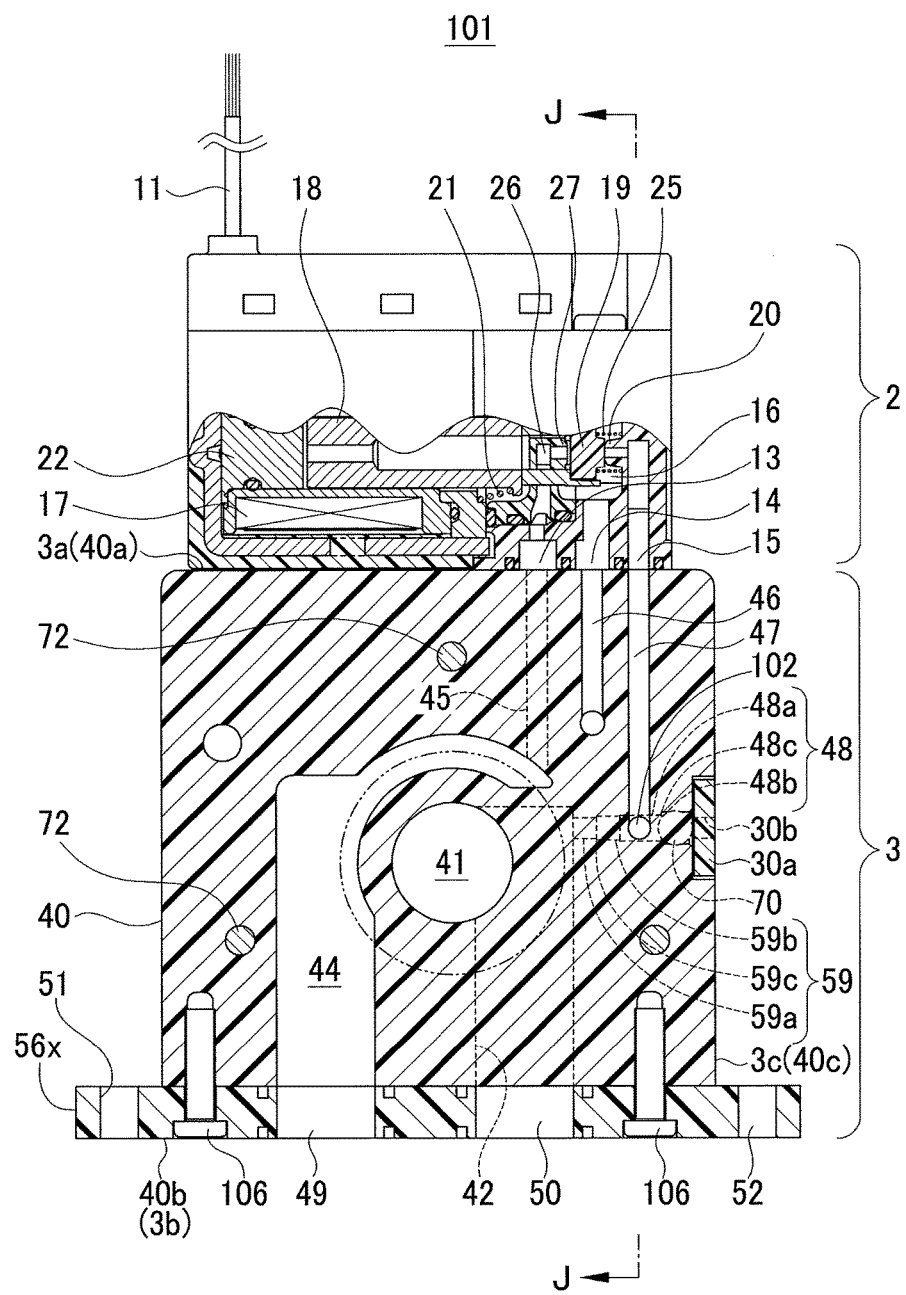
FIG. 16 is a sectional view of a pilot-operated solenoid valve in a second embodiment according to the invention.
Figure 17:
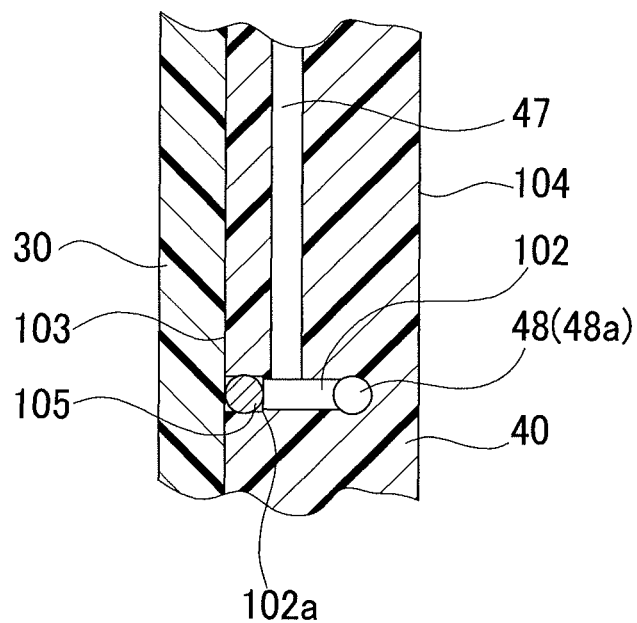
FIG. 17 is an enlarged sectional view of a bypass flow passage and its surrounding part, taken along a line J-J in FIG. 16.

A pilot-operated solenoid valve in a second embodiment according to the invention will be described below. FIG. 16 is a sectional view of a pilot-operated solenoid valve 101 in the second embodiment. FIG. 17 is an enlarged sectional view of a bypass passage 102 and its surrounding parts, corresponding to a sectional view taken along a J-J in FIG. 16. Components of the pilot-operated solenoid valve 101 in the second embodiment are substantially identical to those of the pilot-operated solenoid valve 1 in the first embodiment, and they are assigned with the same reference signs as those in the first embodiment and their details are omitted. The following explanation referring to the accompanying drawings is therefore given only to different features from the first embodiment.

As shown in FIGS. 16 and 17, the second embodiment differs from the first embodiment only in the bypass passage 102 provided in the valve 101. Thus, only this difference is described below. As shown in FIG. 16, the NC passage 47 is formed on a cross section different from a cross section on which the external exhaust passage 48 and the internal exhaust passage 59 appear. As shown in FIG. 17, specifically, the external exhaust passage 48 and the internal exhaust passage 59 are formed between the NC passage 47 and a surface 104 opposite a surface 103 of the block body 40 on which the flat cover 30 is attached. As shown in FIG. 17, the block body 40 is formed with a bottom-closed hole opening in the surface 103 and extending across an end of the NC passage 47 to communicate with the external exhaust passage 48 (the outside passage portion 48a). A metal ball 105 is press-fitted in an opening of the bottom-closed hole to seal the opening. The bypass passage 102 is thus formed. The flat cover 30 fixed to the block body 40 so as to overlap the surface 103, thereby closing the opening of the bypass passage 102. The bypass passage 102 has an open portion with a large inner diameter to form a shoulder portion 102a to position a metal ball 105 in place. The passage block 3 is configured such that the block body 40 is fixed on a mounting plate 56x with bolts 106.

According to the pilot-operated solenoid valve 1 in the second embodiment, the passage block 3 is configured such that the external exhaust passage 48 and the internal exhaust passage 59 are formed on a first cross section taken in parallel to the surface 103, and the NC passage 47 is formed on a second cross section parallel to the first cross section. The passage block 3 further includes the bypass passage 102 communicating the NC passage 47 with the external exhaust passage 48 and the internal exhaust passage 59. Accordingly, for instance, the inlet port 49 and the outlet port 50 can be designed with a small passage cross sectional area, and a total thickness of the block body 40 and the flat cover 30 in an overlapping state can be reduced to as thin as about 10 mm.

Since the opening of the bypass passage 102 is shielded by the flat cover 30, even when the press-fit state of the metal ball 105 is loosened, the metal ball 105 is prevented from falling out and sealing property can be ensured.

(Third Embodiment)

Figure 18:
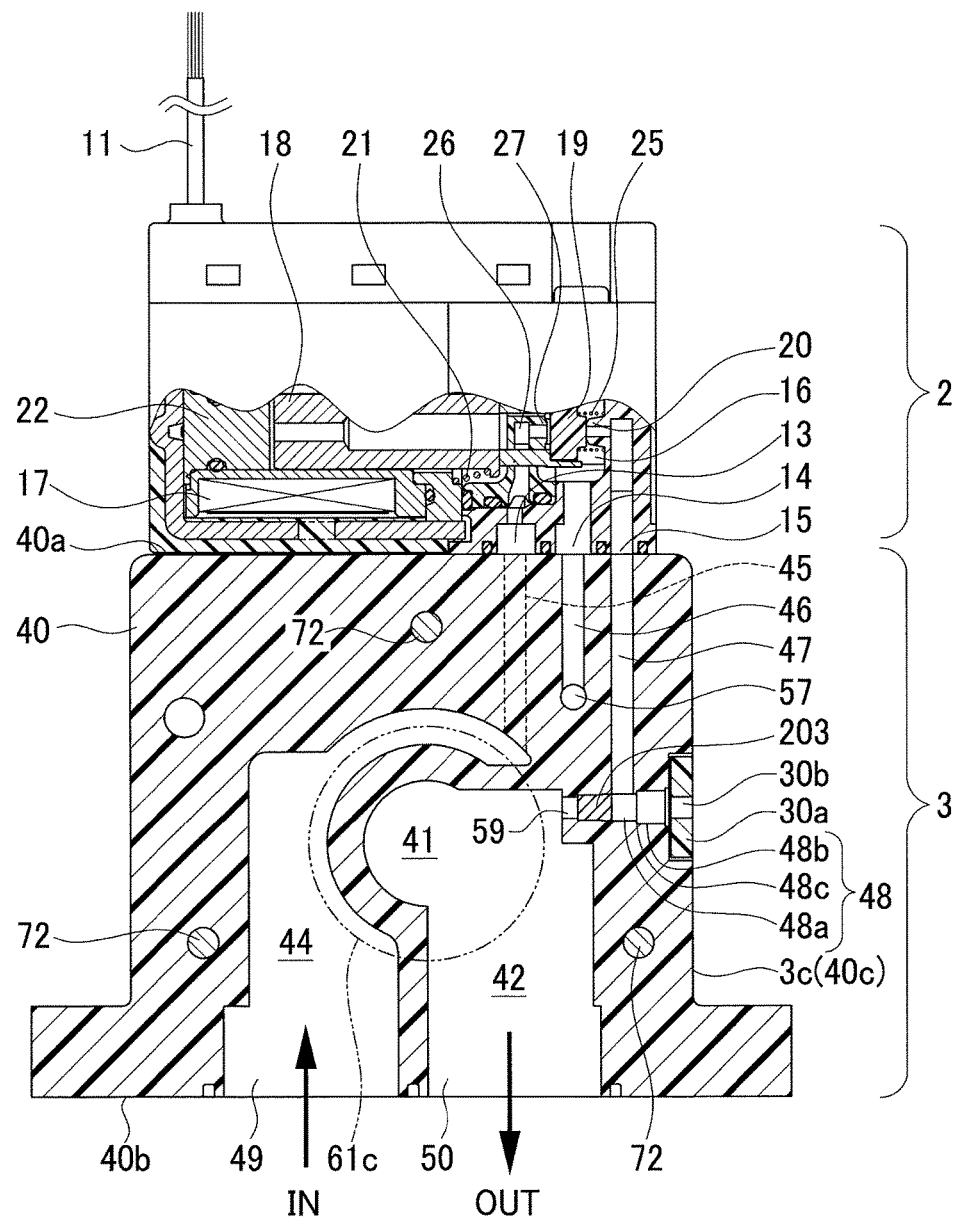
FIG. 18 is a sectional view of a pilot-operated solenoid valve assembled as an external exhaust type configuration in a third embodiment of the invention.
Figure 19:
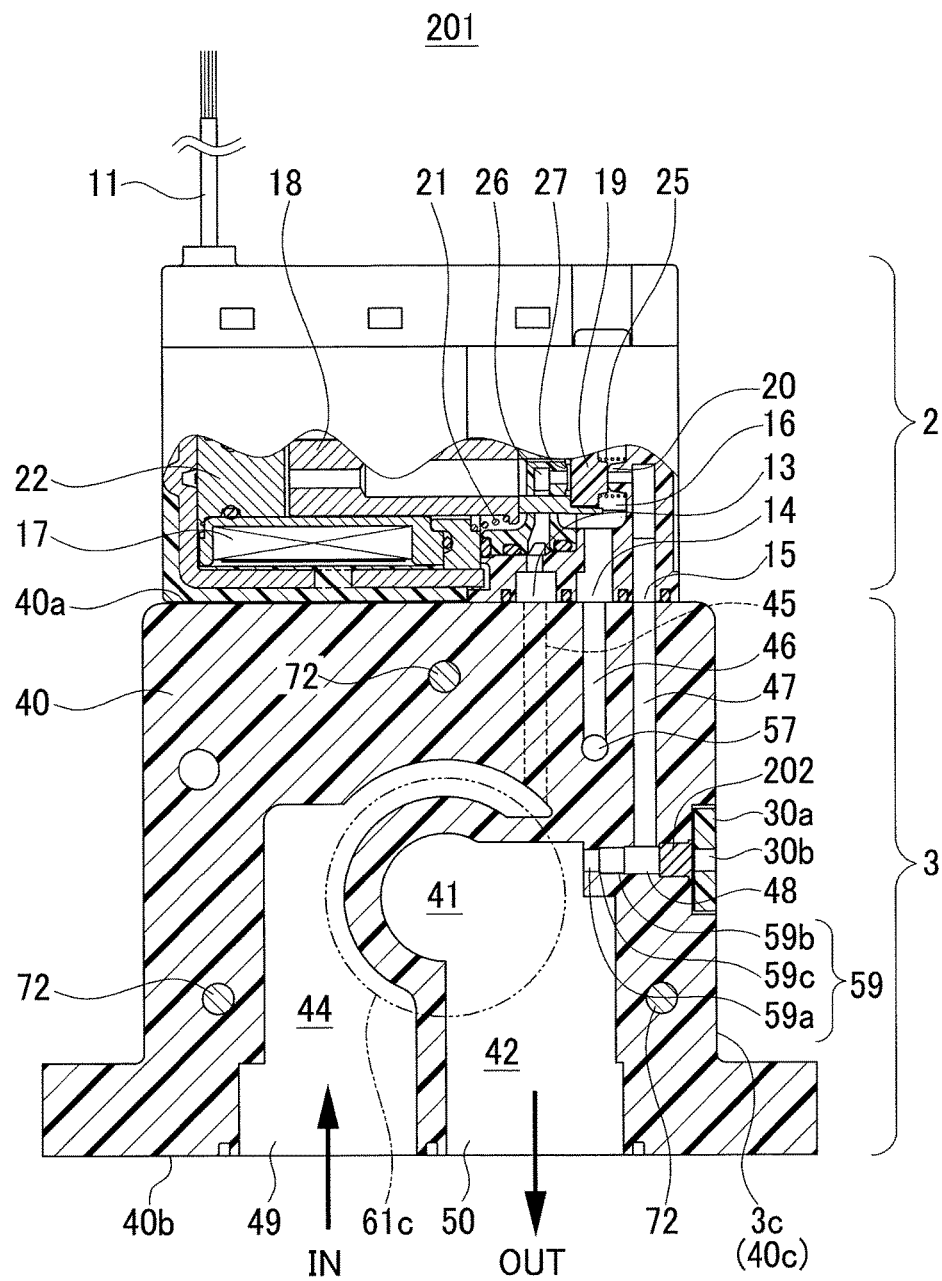
FIG. 19 is the pilot-operated solenoid valve shown in FIG. 18 and assembled as an internal exhaust type configuration.

A pilot-operated solenoid valve in a third embodiment according to the invention will be described below. FIGS. 18 and 19 are sectional views of the pilot-operated solenoid valve in the third embodiment. Specifically, FIG. 18 shows an external exhaust type pilot-operated solenoid valve 201 and FIG. 19 shows an internal exhaust type pilot-operated solenoid valve 201. The pilot-operated solenoid valve 201 in the third embodiment differs from the pilot-operated solenoid valve 1 in the first embodiment only in the use of a first plug 202 or a second plug 203. Only this different configuration is described below.

The first plug 202 shown in FIG. 19 is made of metal in a columnar shape and is press-fitted in the outside press-fit portion 48b so as to abut on the outside shoulder portion 48c. Accordingly, the first plug 202 is held in close contact with the inner wall of the outside press-fit portion 48b and the outside shoulder portion 48c by distorting resin (plastic) material of those portions. Thus, the external exhaust passage 48 is sealed. As shown in FIG. 18, the second plug 203 is made of metal in a columnar shape with a smaller diameter than the first plug 202. The second plug 203 has an insertable size in the external exhaust passage 48 and is press-fitted in the inside press-fit portion 59b so as to abut on the inside shoulder portion 59c. Accordingly, the second plug 203 is held in close contact with the inner wall of the inside press-fit portion 59b and the inside shoulder portion 59c by distorting resin (plastic) material of those portions. Thus, the internal exhaust passage 59 is sealed.

According to the third embodiment, since the firs plug 202 or the second plug 203 has a columnar shape, it can be easily placed by press-fit in a corresponding one of the external exhaust passage 48 and the internal exhaust passage 59.

The first and second plugs 202 and 203 may be made of resin (plastic). In this case, the plastic plug has only to be welded or bonded while it is in a press-fit contact with the passage block 3 made of resin. This can prevent leakage of discharged compressed air into atmosphere or the outlet passage 42 and can avoid a decrease in exhaust efficiency.

(Fourth Embodiment)

Figure 20:
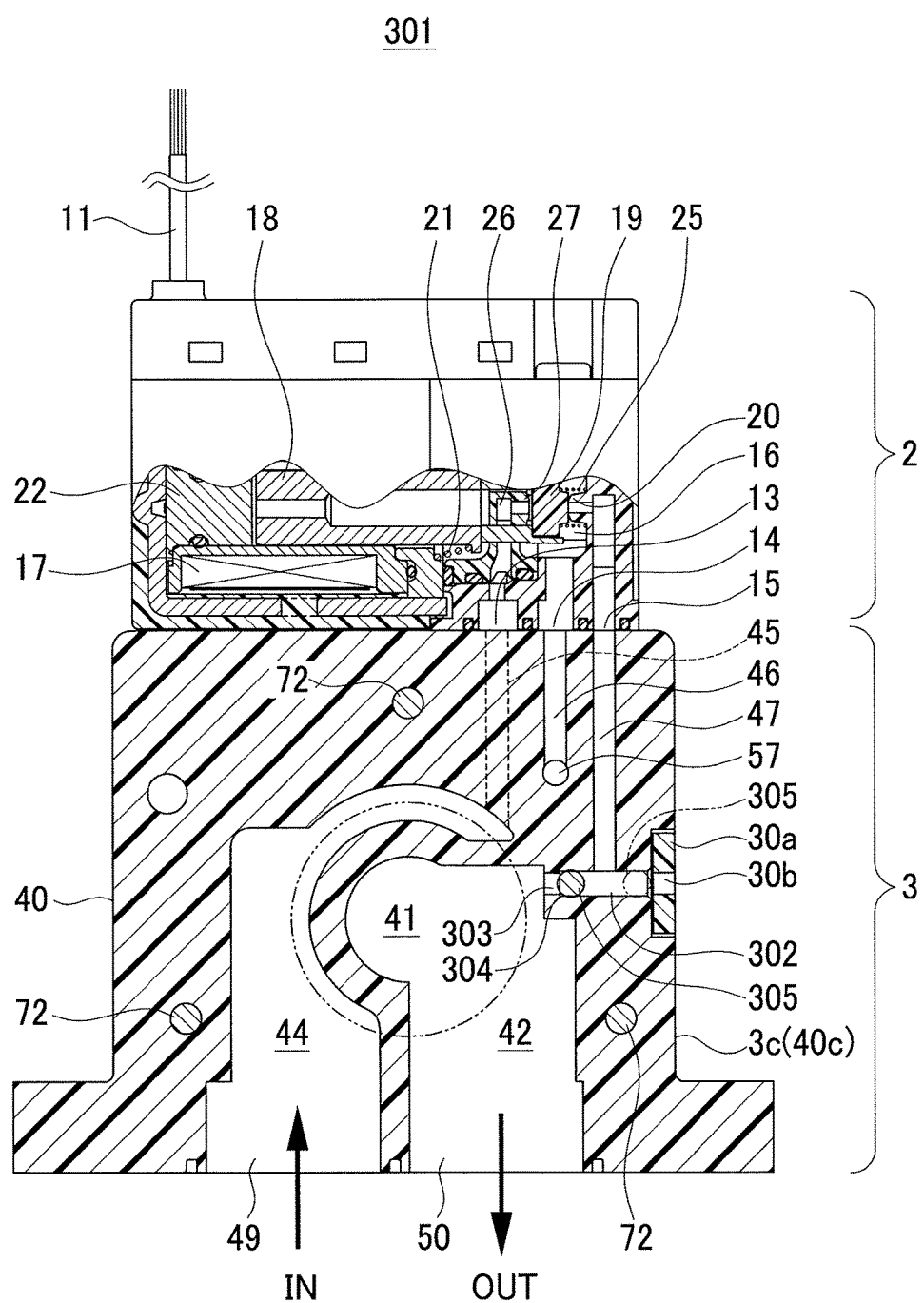
FIG. 20 is a sectional view of a pilot-operated solenoid valve in a fourth embodiment according to the invention.

A pilot-operated solenoid valve in a fourth embodiment according to the invention will be described below. FIG. 20 illustrates a sectional view of a pilot-operated solenoid valve 301 in the fourth embodiment. As shown in FIG. 20, the fourth embodiment differs from the first embodiment only in that an external exhaust passage 302 and an internal exhaust passage 303 are formed with the same diameter. Only this different configuration from the first embodiment is therefore described below.

The block body 40 is formed with a through hole extending in a direction perpendicular to the NC passage 47 from the side surface 40c to communicate with the outlet passage 42, thus forming the internal exhaust passage 303. The block body 40 is further formed with a hole extending coaxial with the through hole from the side surface 40c so as to have a larger diameter than the through hole, so that this large-diameter hole has an annual bottom at the boundary with the internal exhaust passage 303. Specifically, this hole extends to a position between the NC passage 47 and the outlet passage 42, thus forming the external exhaust passage 302. The external exhaust passage 302 has a larger passage diameter than the internal exhaust passage 303, so that a shoulder portion 304 is provided between the external exhaust passage 302 and the internal exhaust passage 303. A metal ball 305 (one example of the sealing member) has a size allowing press-fit in the external exhaust passage 302.

This pilot-operated solenoid valve 301 is configured in such a manner that the metal ball 305 is press-fitted as indicated by a solid line in FIG. 20 in the external exhaust passage 302 so as to abut on the shoulder portion 304, thereby sealing the internal exhaust passage 303. Accordingly, the NC port 15 is communicated with atmosphere through the NC passage 47, external exhaust passage 302, and breather hole 30b of the flat cover 30. This establishes an external exhaust type flow passage in the solenoid valve 301. In contrast, when the metal ball 305 is press-fitted at a position near an opening of the external exhaust passage 302 as indicated by a two-dot chain line, the external exhaust passage 302 is closed. Thus, the NC port 15 is communicated with the outlet passage 42 through the internal exhaust passage 303. This establishes an internal exhaust type flow passage in the solenoid valve 301. Consequently, the solenoid valve 301 can be configured to easily switch between the internal exhaust type flow passage and the external exhaust type flow passage by selecting the position of the metal ball 305 to be placed. This can achieve good assembling workability.

During outward air exhaust, the metal ball 305 is held in close contact with the shoulder portion 304 by the pressure of compressed air to be discharged. Thus, the sealing property can be ensured. During inward air exhaust, the metal ball 305 is locked by the protruding piece 30a, ensuring the sealing property. Accordingly, even when the external exhaust passage 302 and the internal exhaust passage 303 are more simply configured than that in the first embodiment, the sealing function of the metal ball 305 can be obtained. Further, the structure of a molding die is also made simple by just the simplified flow passage structure as compared with the first embodiment. This embodiment can also reduce manufacturing cost.

The pilot-operated solenoid valve 301 in the fourth embodiment can use the metal ball 305 in common between sealing the external exhaust passage 302 and sealing the internal exhaust passage 303, and hence can reduce burden of parts control.

(Fifth Embodiment)

Figure 21:
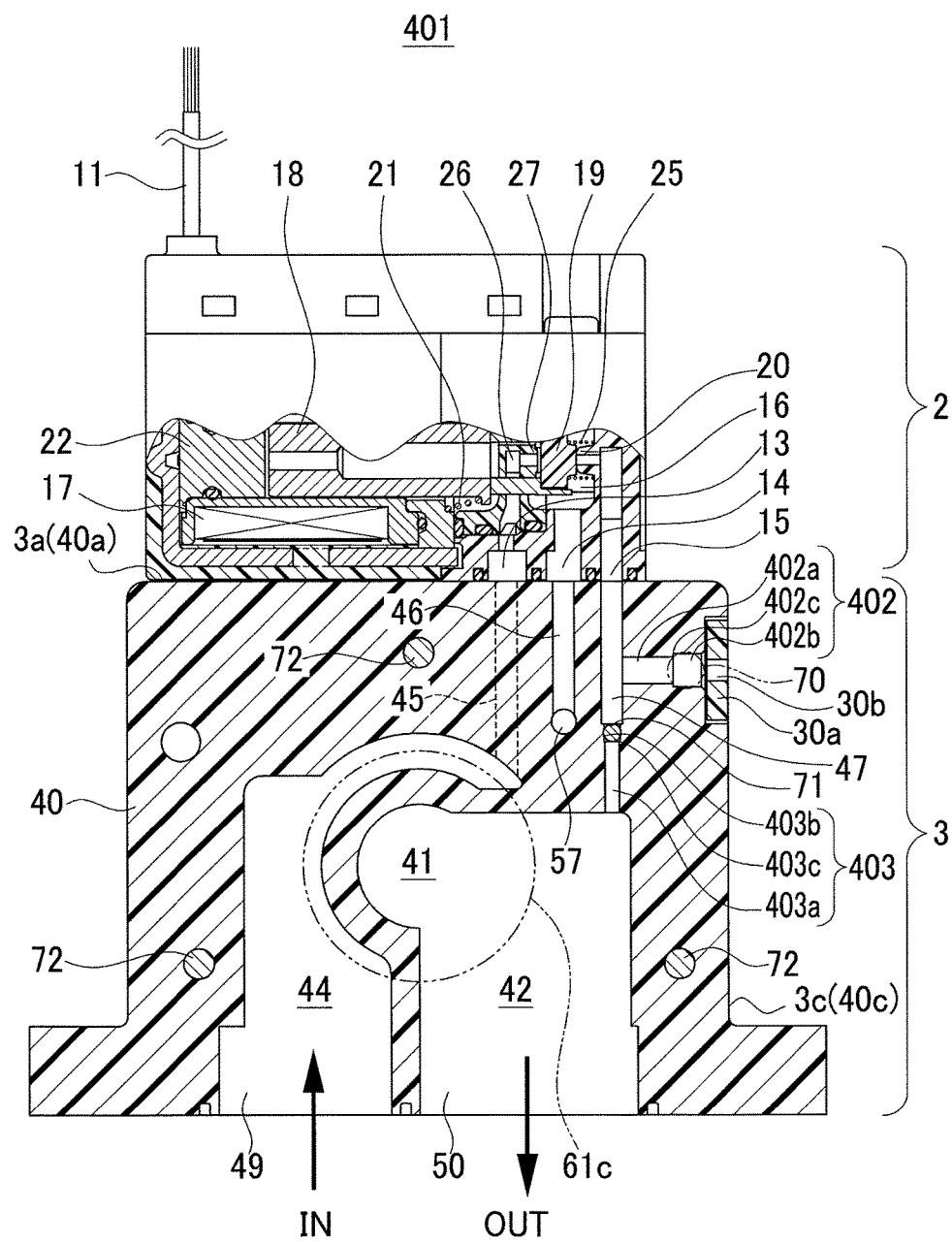
FIG. 21 is a sectional view of a pilot-operated solenoid valve in a fifth embodiment according to the invention, assembled as an external exhaust type configuration.

A pilot-operated solenoid valve in a fifth embodiment according to the invention will be described below. FIG. 21 is a sectional view of a pilot-operated solenoid valve 401 in the fifth embodiment. As shown in FIG. 21, the fifth embodiment differs from the first embodiment only in that an external exhaust passage 402 is formed in a direction perpendicular to an internal exhaust passage 403. Only this different configuration from the first embodiment is therefore described below.

The external exhaust passage 402 is formed to extend from the side surface 40c of the block body 40 in a direction perpendicular to the NC passage 47. With respect to the NC passage 47, the external exhaust passage 402 communicates with a portion between an opening (an upper open end in FIG. 21) and an end (a lower open end in FIG. 21) of the NC passage 47. The external exhaust passage 402 includes an outside press-fit portion 402b having a larger diameter than an outside passage portion 402a. An outside shoulder portion 402c provided between the outside passage portion 402a and the outside press-fit portion 402b serves to place a first metal ball 70 in position.

The internal exhaust passage 403 is formed to extend coaxially with the NC passage 47 from the side surface 40a of the block body 40 to communicate with the outlet passage 42. The internal exhaust passage 403 includes an inside passage portion 403a having a smaller diameter than the NC passage 47, and an inside press-fit portion 403b having a larger diameter than the inside passage portion 403a and a smaller diameter than the NC passage 47. Accordingly, the internal exhaust passage 403 is provided with an inside shoulder portion 403c between the inside passage portion 403a and the inside press-fit portion 403b so that the second metal ball 71 press-fitted in the inside press-fit portion 403b is placed in position.

In the pilot-operated solenoid valve 401 in the fifth embodiment, as long as the first metal ball 70 or the second metal ball 71 is press-fitted in a corresponding one of the external exhaust passage 402 and the internal exhaust passage 403 to seal, a flow passage adapted for the internal exhaust type or external exhaust type can be easily formed in the passage block 3. According to the fifth embodiment, therefore, the pilot-operated solenoid valve 401 adaptable for both the internal exhaust type and the external exhaust type can be achieved.

The present invention may be embodied in other specific forms without departing from the essential characteristics thereof.

In the foregoing embodiments, the protruding piece 30a is formed with the breather hole 30b. As an alternative, instead of the breather hole 30b, a recessed groove may be formed in the protruding piece 30a to allow the external exhaust passage 48 to open to atmosphere through the groove. This can prevent foreign subjects from entering the external exhaust passage 48.

The block body 40 in the foregoing embodiments is made of resin, but it may be made of metal. In this case, a metal sealing member is required to be welded or bonded to the block body 40 to prevent fluid leakage.

REFERENCE SIGNS LIST 1, 101, 201, 301, 401 Pilot-operated solenoid valve
2 Pilot valve unit
3 Passage block
3a to 3c First to Third surfaces
13 NO port
14 Common port
15 NC port
18 Movable core
22 Fixed core
30 Flat cover
32 Flat-cover communication passage
35 Recess
40 Block body
42 Outlet passage
43 Valve chamber
44 Inlet passage
45 NO passage
46 Common passage
47 NC passage
48, 302, 402 External exhaust passage
49 Inlet port
50 Outlet port
54 Back chamber
55 Valve seat
59, 303, 403 Internal exhaust passage
60 Diaphragm valve element
70, 71 First and second metal balls
102 Bypass passage
202, 203 First and second plugs
305 Metal ball

What is claimed is:

1. A pilot-operated solenoid valve provided with a pilot valve unit having a fixed core and a movable core, and a passage block formed with a valve seat which a valve element comes into contact or separates from,
wherein the valve element is a diaphragm valve element,
the pilot valve unit includes an NO port, a common port, and an NC port,
the passage block is formed with an inlet port, an outlet port, a back chamber defined by the diaphragm valve element, an NO passage for communicating the inlet port with the NO port, a common passage for communicating the back chamber with the common port, an NC passage communicated with the NC port, an external exhaust passage for communicating the NC passage with atmosphere, and an internal exhaust passage for communicating the outlet port with the NC passage,
the pilot-operated solenoid valve further includes a sealing member to seal one of the external exhaust passage and the internal exhaust passage,
the passage block has a rectangular parallelepiped shape having a pair of wide opposite surfaces and four side surfaces surrounding the wide opposite surfaces, the four side surfaces including a first surface attached thereon with the pilot valve unit and a second surface formed with at least one of the inlet port and the outlet port,
the diaphragm valve element is placed in parallel with the pair of wide opposite surfaces,
the passage block includes a block body and a flat cover having a flat plate shape, the flat cover including a recess forming the back chamber, and
the flat cover is formed with a flat-cover communication passage for communicating the recess with the common port,
the external exhaust passage and the internal exhaust passage are coaxially provided,
the external exhaust passage has a passage diameter larger than the internal exhaust passage,
the external exhaust passage and the internal exhaust passage configured to enable:
(1) the sealing member to be press-fitted in the external exhaust passage when the sealing member is a first sealing member, and
(2) the sealing member, having an insertable size in the external exhaust passage, to be press-fitted in the internal exhaust passage when the sealing member is a second sealing member, where the first sealing member is sized to be larger than the second sealing member.

2. The pilot-operated solenoid valve according to claim 1, wherein the sealing member has at least one of a spherical shape and a columnar shape.

3. The pilot-operated solenoid valve according to claim 2, wherein the sealing member is fixed to the passage block by at least one of welding and bonding.

4. The pilot-operated solenoid valve according to claim 3, wherein the passage block is configured such that the external exhaust passage and the internal exhaust passage are formed on a first section, and the NC passage is formed on a second section parallel to the first section, and the passage block is formed with a bypass passage for placing the NC passage in communication with the external exhaust passage and the internal exhaust passage.

5. The pilot-operated solenoid valve according to claim 2, wherein the passage block is configured such that the external exhaust passage and the internal exhaust passage are formed on a first section, and the NC passage is formed on a second section parallel to the first section, and the passage block is formed with a bypass passage for placing the NC passage in communication with the external exhaust passage and the internal exhaust passage.

6. The pilot-operated solenoid valve according to claim 1, wherein the sealing member is fixed to the passage block by at least one of welding and bonding.

7. The pilot-operated solenoid valve according to claim 6, wherein the passage block is configured such that the external exhaust passage and the internal exhaust passage are formed on a first section, and the NC passage is formed on a second section parallel to the first section, and the passage block is formed with a bypass passage for placing the NC passage in communication with the external exhaust passage and the internal exhaust passage.

8. The pilot-operated solenoid valve according to claim 1, wherein the passage block is configured such that the external exhaust passage and the internal exhaust passage are formed on a first section, and the NC passage is formed on a second section parallel to the first section, and the passage block is formed with a bypass passage for placing the NC passage in communication with the external exhaust passage and the internal exhaust passage.

\* \* \* \* \*